(12) United States Patent
Nagano et al.

(10) Patent No.: US 6,396,165 B1
(45) Date of Patent: May 28, 2002

(54) ENGINE START CONTROL SYSTEM

(75) Inventors: Shuji Nagano, Toyota; Kojiro Kuramochi; Atsushi Tabata, both of Okazaki; Hatsuo Nakao, Gotenba, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/389,346

(22) Filed: Sep. 3, 1999

(30) Foreign Application Priority Data

Sep. 25, 1998 (JP) ............................. 10-271705
Mar. 29, 1999 (JP) ............................. 11-087167

(51) Int. Cl.$^7$ ............................................. B60R 22/00
(52) U.S. Cl. ................................... 307/10.6; 290/40 R
(58) Field of Search .......................... 307/10.1, 10.6; 290/40 A, 40 C, 34, 38 R, 492, 40 B, 40 E, 40 R; 318/140; 180/65.2; 123/396, 381, 179.3, 179.4

(56) References Cited

U.S. PATENT DOCUMENTS

| 4,004,208 A | | 1/1977 | Tamminen |
|---|---|---|---|
| 4,095,664 A | | 6/1978 | Bray |
| 4,319,140 A | | 3/1982 | Paschke |
| 4,335,429 A | | 6/1982 | Kawakatsu |
| 4,407,132 A | | 10/1983 | Kawakatsu et al. |
| 4,414,937 A | | 11/1983 | Ueda et al. |
| 4,485,772 A | | 12/1984 | Uchida et al. |
| 4,510,396 A | | 4/1985 | Uchida et al. |
| 5,343,970 A | | 9/1994 | Severinsky |
| 5,492,189 A | | 2/1996 | Kriegler et al. |
| 5,558,173 A | | 9/1996 | Sherman |
| 5,558,175 A | | 9/1996 | Sherman |
| 5,562,566 A | | 10/1996 | Yang |
| 5,608,309 A | * | 3/1997 | Hikita et al. .................. 322/28 |
| 5,713,425 A | | 2/1998 | Buschhaus et al. |
| 5,818,116 A | * | 10/1998 | Nakae et al. ............. 290/38 R |
| 5,841,266 A | * | 11/1998 | Hikita et al. .................... 322/8 |
| 5,865,263 A | * | 2/1999 | Yamaguchi et al. ....... 180/65.2 |
| 5,934,395 A | * | 8/1999 | Koide et al. ............... 180/65.2 |
| 5,977,646 A | * | 11/1999 | Lenz et al. ............... 290/40 C |
| 6,018,199 A | * | 1/2000 | Shiroyama et al. ........... 290/37 |
| 6,073,610 A | * | 1/2000 | Matsumoto et al. ........ 123/396 |
| 6,177,734 B1 | * | 1/2001 | Masberg et al. ............. 290/31 |

FOREIGN PATENT DOCUMENTS

| DE | 31-40 492 A1 | 6/1982 |
|---|---|---|
| EP | 0 072 997 A2 | 3/1983 |
| EP | 0 528 412 A1 | 2/1993 |
| EP | 0 552 140 A1 | 7/1993 |
| EP | 0 729 858 A1 | 9/1996 |
| JP | A-50-30223 | 3/1975 |
| JP | A-3-273933 | 12/1991 |
| JP | A-5-319110 | 12/1993 |
| JP | A-7-172196 | 7/1995 |
| JP | A-8-126115 | 5/1996 |
| JP | A-9-117012 | 5/1997 |

OTHER PUBLICATIONS

English–language abstract of JP 09 222035, published Aug. 26, 1997.
English–language abstract of JP 09 222064, published Aug. 26, 1997.

* cited by examiner

Primary Examiner—Ronald W. Leja
Assistant Examiner—Sharon Polk
(74) Attorney, Agent, or Firm—Oliff & Berridge PLC

(57) ABSTRACT

An engine start control system includes a starter and a motor generator capable of starting an engine. The engine start control system further includes a controller that determines the rotational resistance of the crankshaft based on cooling water temperature of the engine or viscosity of the engine oil, and then selects the starting mode of the engine by a starter motor and a motor generator based on the determination. Consequently, the startability of the engine is improved according to the state of the vehicle.

12 Claims, 13 Drawing Sheets

FIG. 9

| | C0 | C1 | C2 | B0 | B1 | B2 | B3 | B4 | F0 | F1 | F2 |
|---|---|---|---|---|---|---|---|---|---|---|---|
| P | ○ | | | | | | | | ○ | | |
| R(Stopped) | ○ | | ○ | | | | | ○ | | | |
| R(Running) | | | ○ | ○ | | | | ○ | | | |
| N | ○ | | | | | | | | | | |
| 1st | ○ | ○ | | | | | | | ○ | | |
| 2nd | △ | ○ | | | | | | △ | ○ | | ○ |
| 3rd | ○ | ○ | | | △ | ○ | ○ | | ○ | ○ | |
| 4th | ○ | ○ | ○ | | | ⊗ | | | ○ | | |
| 5th | | ○ | ○ | ○ | | ⊗ | | | ○ | | |

ENGINE START CONTROL SYSTEM

INCORPORATION BY REFERENCE

The disclosure of Japanese Patent Application No. HEI 11-87167 filed on Mar. 29, 1999 including the specification, drawings and abstract are incorporated herein by reference in its entirety.

BACKGROUND OF THE INVENTION

1. Field of Invention

The invention relates to a control system for starting an engine installed in a vehicle, and more particularly to a control system provided with a plurality of starting systems.

2. Description of Related Art

An engine, such as a gasoline engine is constructed such that fuel-air mixture goes through an intake stroke and a compression stroke before being ignited to cause an explosive combustion, and the pressure generated thereby moves the piston to generate power, and the power is then transmitted to a crankshaft. The control system for the engine is provided with a starting system for rotating the crankshaft at a rotational speed equal to or greater than a predetermined rotational speed when starting the engine.

Japanese Patent Laid-Open No. HEI 9-117012 discloses a vehicle provided with such a starting system. The vehicle includes an electric motor, an engine, and a generator, which serve as power sources for driving the vehicle, and the generator is connected to the engine. The generator is operated as an electric motor to rotate the engine from a stopped state up to a predetermined idle speed. When the engine speed reaches the idle speed, the fuel is supplied to the engine and then ignited. Then, the generator is no longer operated as an electric motor.

In addition to the aforementioned publication, there is also suggested a start control system of a vehicle equipped with an electric motor for driving auxiliaries of a vehicle and a starter motor provided exclusively for engine start, wherein at least one of the electric motor and the starter motor can be used for starting the engine.

However, because a single generator is used to serve as the electric motor for starting the engine, the startability of the engine is adversely affected due to nonconformance of the rotational speed or the torque of the electric motor with the state of the vehicle. Also, because a single generator is used to serve as the electric motor, the startability of the engine is adversely affected when the state of charge of the battery for supplying electrical energy to the electric motor is insufficient to start the engine. Moreover, a pair of large and small spur gears are usually employed as means for power transmission between the starter motor and the engine. Accordingly, there exists the possibility of noise being generated at engine start depending on specifications of the spur gear mesh and the selection of the engine starting mode.

SUMMARY OF THE INVENTION

The invention has been made in the light of the aforementioned circumstances and therefore it is an object of the invention to provide a start control system capable of improving the engine startability in conformance with the state of a vehicle.

In a first aspect of the invention, an engine start control system includes a plurality of starting systems capable of starting the engine, and a controller. The controller determines a first associated amount associated with the rotational resistance of the engine, and then selects the mode of starting the engine by the plurality of starting systems in accordance with the determination results. The first associated amount refers to a phenomenon or a state which allows a direct or indirect determination of the engine rotational resistance.

According to the first aspect, the first associated amount associated with the engine rotational resistance is determined, and the starting mode of the engine is selected based on the determination result of the first associated amount. For example, the starting mode of the engine is selected such that a torque corresponding to the rotational resistance of the engine is obtained. That is, when the rotational resistance of the engine is comparatively high, the starting mode of the plurality of starting systems is selected so that a high starting torque can be obtained. This improves the startability of the engine irrespective of the rotational resistance of the engine.

The first associated amount may be the viscosity of the engine oil or the temperature of the engine cooling water. The rotational resistance of the engine is estimated based on the viscosity of the engine oil or the temperature of the engine cooling water.

In a second aspect of the invention, the engine start control system provided with a plurality of starting systems capable of starting the engine is also capable of driving a functional device other than the engine using either one or more of the starting systems. The controller of the engine start control system further determines a drive state of the functional device and selects the mode of starting the engine by the plurality of starting systems based on the determined drive state. The drive state of the functional device may be the rotational speed of the functional device, for example.

According to the second aspect, the drive state of the functional device is determined, and the mode of starting the engine by the plurality of starting systems is selected based on the determination result. For example, the starting mode of the engine is selected so that a rotational speed appropriate for starting the engine can be obtained. That is, when the functional device is driven by either one or more of the starting systems and when the rotational speed of the starting system is comparatively high, the engine can be rotated by a starting system that is driving a functional device after the engine is rotated by a starting system that is not driving a functional device. This makes it possible to gradually increase the engine rotational speed, whereby the startability of the engine is improved.

According to a third aspect of the invention, an engine start control system includes a plurality of starting systems capable of starting the engine, a plurality of energy sources which supply energy to respective starting systems, and a controller that determines the states of the plurality of energy sources, and selects the mode of starting the engine by the plurality of starting systems based on the determined states of the plural energy sources.

According to the third aspect, the states of the plurality of energy sources are determined, and the mode of starting the engine by the plurality of starting systems is selected based on the determination result. For example, the starting mode of the engine is selected so that an energy appropriate for starting the engine can be obtained. That is, by selecting a starting mode for starting the engine with a starting system having a higher energy state, the startability of the engine can be improved and a decrease in the energy amount of a starting system having a lower energy state can be suppressed.

According to a fourth aspect of the invention, an engine start control system includes a power transmission member which transmits power from the engine or from at least one of the power sources other than the engine, a plurality of starting systems capable of starting the engine, and a controller that determines a second associated amount associated with the vehicle speed in a state where the vehicle is run by power from the power source, and then selects for selecting the mode of starting the engine by the plurality starting systems based on the determined second associated amount. The second associated amount refers to a phenomenon or a state which allows a direct or indirect determination of the vehicle speed.

According to the fourth aspect, a difference between the engine rotational speed and the rotational speed of the power transmission member is estimated based on the second associated amount associated with the vehicle speed, and the starting mode of the engine is selected based on the estimation result.

In accordance with the first through fourth aspects of the invention, the selection of the starting mode of the engine involves selection of which starting system function (rotational speed, torque, and the like) to use, the number of starting systems employed for starting the engine, and the timings for driving and stopping each starting system when a plurality of starting systems are used.

According to a fifth aspect of the invention, an engine start control system includes a first starting system capable of starting the engine by transmitting power to the engine via a gear transmission, a second starting system capable of starting the engine by transmitting power from the engine via a belt transmission, and a controller that, upon starting the engine, first drives the first starting system, then drives the second starting system and continues driving the second starting system even after the first starting system is stopped.

According to the fifth aspect, upon engine start, first, the first starting system is driven and the power is transmitted to the engine via the gear transmission. Then, the second starting system is driven, and the power is transmitted to the engine via the belt transmission. The engine is driven by the power transmitted from the second starting system after the first starting system is stopped. For example, the drive time of the first starting system, which transmits power to the engine via the gear transmission, is set short, so that the generation of noise due to engine start can be suppressed. The belt transmission, which transmits power from the second starting system to the engine, prevents generation of gear noise and abnormal sounds due to backlash as compared to the gear transmission upon engine start. Also, the belt transmission does not require lubricating oil for cooling and lubricating the engaging portions because the device does not contain any engaging portions such as in the gear transmission. Accordingly, temperature increase or power loss caused by agitation of the lubricating oil is eliminated. Also, the construction of the belt transmission is simple because it does not require a lubricating system.

According to a sixth aspect of the invention, an engine start control system includes a first starting system connected to a crankshaft of the engine, a second starting device connected to the crankshaft of the engine, and a controller that, upon starting the engine, first drives the first starting system, then drives the second starting system before driving of the first starting system is terminated.

According to the sixth aspect, the engine is started by drive of the first and the second starting systems in parallel, whereby the startability of the engine is improved.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein:

FIG. 9 is a chart illustrating a control mode of a frictional engagement device of an automatic transmission shown in FIG. 7;

DETAILED DESCRIPTION OF PREFERRED EMBODIMENTS

Figure 2:
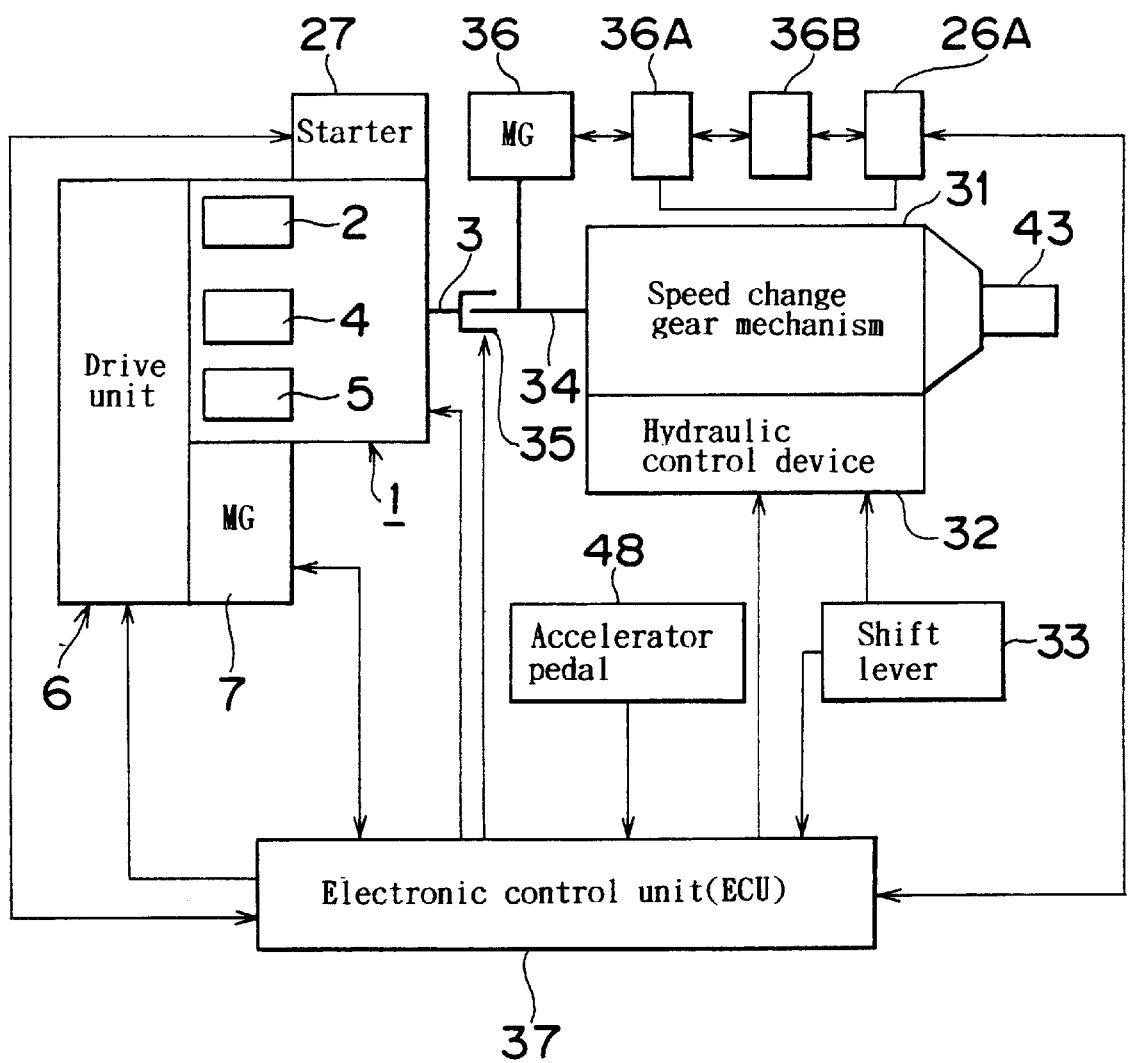
FIG. 2 is a block diagram illustrating a structure of a hybrid vehicle to which the invention is applied.

A first embodiment of the invention will be described in detail with reference to the drawings. FIG. 2 is a block diagram illustrating a schematic construction of a hybrid vehicle to which the invention is applied. That is, the vehicle is provided with different types of power sources. An internal combustion engine such as a gasoline engine, a diesel engine, an LPG engine, a gas turbine engine, and the like are employed as an engine 1 which is a first power source. The engine 1 is of a known construction provided with, for example, a fuel injection system, an intake and exhaust system, an ignition system, and the like.

An electronic throttle valve 2 is provided on an intake pipe (not shown) of the engine 1 such that an opening degree of the electronic throttle valve 2 is electrically controlled. The engine 1 is also constructed such that heat energy generated by the combustion of fuel is converted into mechanical energy, which is equal to three rotations of a crankshaft.

Further, the engine 1 is provided with a lubricating system 4. The lubricating system 4 is for cooling and lubricating the rubbing portions of parts of the engine 1. Engine oil (or the lubricating oil) is supplied to such moving parts of engine 1 as a crankshaft 3, a piston (not shown), and a connecting rod by the lubricating system 4, and the moving parts are cooled and lubricated thereby.

Furthermore, the engine 1 is provided with a water-cooled cooling system 5. The water-cooled cooling system 5 cools the engine 1. The water-cooled cooling system 5 includes a water pump (not shown) driven by the crankshaft 3, a water jacket (not shown) formed inside an engine body, and a radiator (not shown) connected to the water pump and the water jacket. The cooling water which has been heated by the water jacket is transported to the radiator to be cooled. The cooled water is then returned to inside the engine by the water pump.

Figure 3:
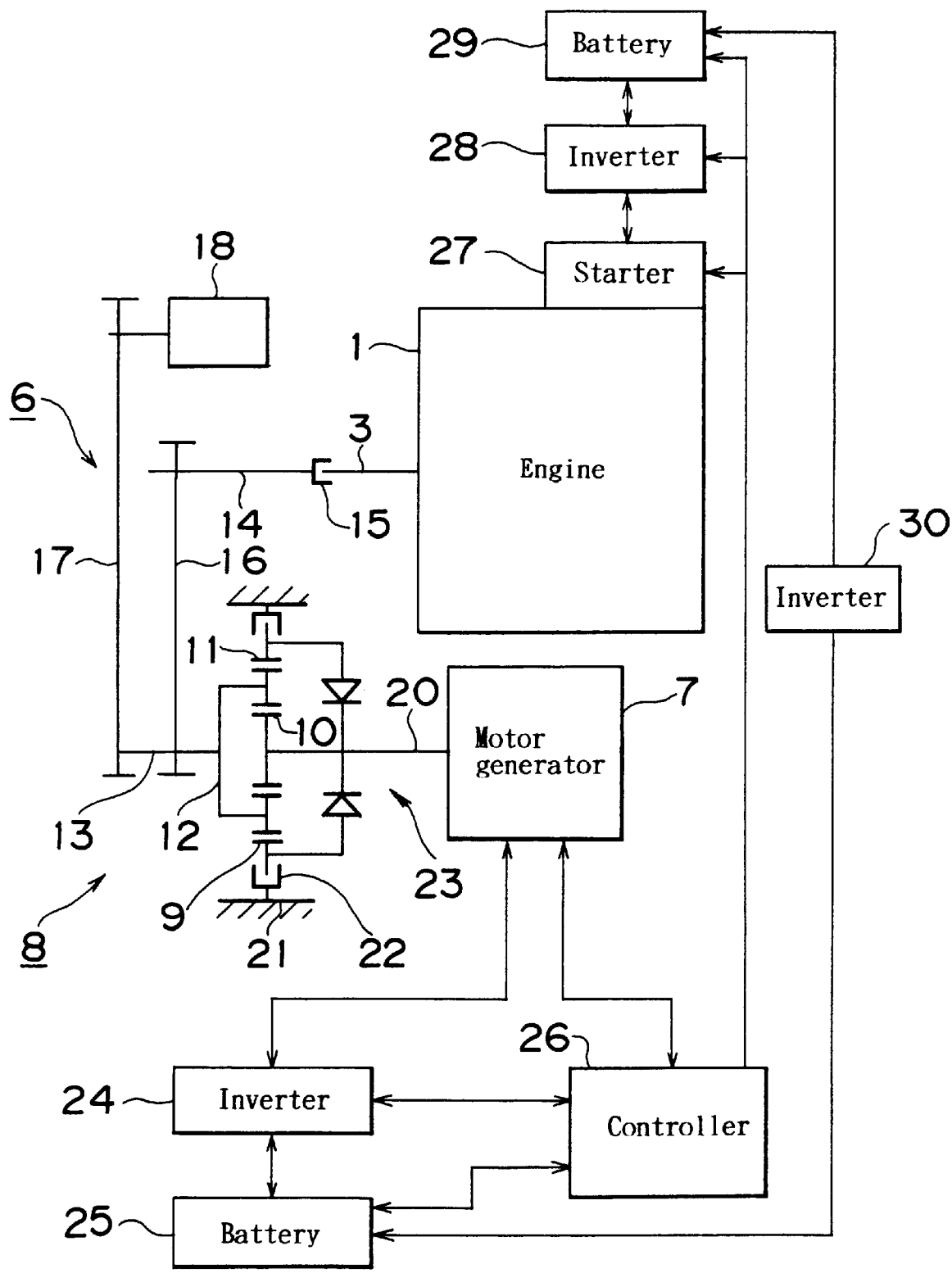
FIG. 3 is a type diagram illustrating the drive circuit of the plurality of starting systems shown in FIG. 2.

FIG. 3 is a conceptual drawing illustrating an arrangement of the starting systems of the engine 1. A drive unit 6 and a motor generator 7 are disposed on one transmission path of power (or torque) output from the engine 1. An alternating current synchronous type, for example, is applicable as the motor generator 7. The motor generator 7 includes a rotor (not shown) having a permanent magnet (not shown) and a stator (not shown) wound with coil (not shown). A rotating magnetic field is generated when a three-phase alternating current is applied to a three-phase coil. Torque is then generated by controlling the rotating magnetic field according to the rotational position and rotational speed of the rotor. The torque generated by the motor generator 7 is substantially proportional to the size of current. The rotational speed of the motor generator 7 is controlled by the frequency of the alternating current.

The drive unit 6 includes a deceleration device 8 which is connected to the engine 1 and the motor generator 7. The deceleration device 8 includes a concentrically disposed ring gear 9 and a sun gear 10, and a plurality of pinion gears 11 engaged with the ring gear 9 and the sun gear 10. The plurality of pinion gears 11 are supported by a carrier 12. A rotation shaft 13 is connected to the carrier 12. Also, a rotation shaft 14 is provided concentrically with the crankshaft 3 of the engine 1, and the rotation shaft 14 and the crankshaft 3 are connected and disconnected by a clutch mechanism 15. A chain 16 is provided for transmitting torque between the rotation shaft 14 and the rotation shaft 13. An auxiliary 18 such as a compressor for an air conditioner is connected to the rotation shaft 13 via a chain 17.

The motor generator 7 is provided with an output shaft 20, and the sun gear 10 is attached to the output shaft 20. A brake 22 for stopping the rotation of the ring gear 9 is provided on a casing 21 of the drive unit 6. A one-way clutch 23 is disposed in the periphery of the output shaft 20. An inner ring of the one-way clutch 23 is coupled to the output shaft 20, and an outer ring of the one-way clutch 23 is coupled to the ring gear 9. The deceleration device 8 transmits torque between the engine 1 and the motor generator 7 and performs deceleration. The one-way clutch 23 is engaged when power output from the engine 1 is transmitted to the motor generator 7.

The motor generator 7 functions as an electric motor for starting the engine 1, and as a generator (alternator) for generating electricity by the power of the engine 1, and the motor generator 7 also drives the auxiliary 18 while the engine 1 is stopped. When the motor generator 7 is used as an electric motor, the direct current voltage from a battery 25 is converted into alternating current voltage before being supplied to the motor generator 7.

When starting the engine 1 by the motor generator 7, the clutch mechanism 15 and the brake 22 are engaged and the one-way clutch 23 is disengaged. When using the motor generator as an alternator, the clutch mechanism 15 and the one-way clutch 23 are engaged and the brake 22 is disengaged. When the auxiliary 18 is driven by the motor generator 7, the brake 22 is engaged and the clutch mechanism 15 and the one-way clutch 23 are disengaged.

The battery 25 is connected to the motor generator 7 via an inverter 24. A controller 26 is connected to motor generator 7, the inverter 24, and the battery 25. It is possible to charge the battery 25, via the inverter 24, with electrical energy generated by the motor generator 7.

The controller 26 detects or controls a current value supplied to the motor generator 7 from the battery 25 or a current value generated by the motor generator 7. Further, the controller 26 controls the rotational speed of the motor generator 7 and detects and controls the state of charge (SOC) of the battery 25. The motor generator 7 is capable of controlling the rotational speed in the range of 0 to 6000 rpm and the torque in the range of 0 to 120 Nm, for example.

A starter motor 27 is provided as another starting system for starting the engine 1. The starter motor 27 is of a known construction such as a magnetic shift type or a reduction gear type. A pinion gear (not shown) is provide on an output shaft (not shown) of the starter motor 27. On the other hand, a ring gear (not shown) is provided on the flywheel (not shown) of the crankshaft 3. The starter motor is constructed such that the engine 1 is started by the engagement of the pinion gear and the ring gear, and the pinion gear separates from the ring gear after the engine 1 is started.

A battery 29 is connected to the starter motor 27 via an inverter 28. The direct current voltage from the battery 29 is converted into alternating current voltage before being supplied to the starter motor 27 for driving the starter motor 27. The starter motor 27 is capable of controlling the rotational speed in the range of 0 to 400 rpm and the torque in the range of 0 to 12 Nm, for example. Thus, the characteristics of the motor generator 7 and the starter motor 27 are different.

Because the battery 25 has higher voltage than the battery 29, it is possible to conduct electricity between the battery 25 and the battery 29 by an inverter 30 provided separately from the inverters 24 and 28. The engine 1 can be started by at least one of the motor generator 7 and the starter motor 27. The starter motor 27 is used when starting the engine 1 at an extremely low temperature.

On the other power transmission path of the engine 1 is disposed a speed change gear mechanism 31. The speed change gear mechanism 31 is of a known construction including a plurality of planetary gears (not shown) and a frictional engagement device (not shown) such as a clutch and a brake. A hydraulic control device 32 controls an engagement and disengagement state of the frictional engagement device or an engagement pressure of the frictional engagement device. The hydraulic control device 32 is of a known construction having various solenoid valves.

A shift lever 33 controls the speed change gear mechanism 31 and the hydraulic control device 32 by manual operation. Selection of various shift positions is made possible by manual operation of the shift lever 33. For example, a P (parking) position, an R (reverse) position, an N (neutral) position, a D (drive) position, a 4 position, a 3 position, a 2 position, and an L (low) position can be selected. In a state where the D position, the 4 position, the 3 position, or the 2 position is selected, the hydraulic control device 32 is activated based on the vehicle running state, and the gear ratio of the speed change gear mechanism 31 is automatically controlled.

A clutch mechanism 35 capable of being selectively engaged and disengaged is disposed between an input shaft 34 of the speed change gear mechanism 31 and the crankshaft 3. The engagement and disengagement state of the clutch mechanism 35 is controlled by supply and discharge of hydraulic pressure, for example. A motor generator 36 capable of transmitting and cutting off power to the input shaft 34 is provided. The motor generator 36 serves as a second power source for running the vehicle, and the motor generator 36 is constructed similarly to the motor generator 7. The motor generator 36 functions as a generator and an electric motor. A battery 36B is connected to the motor generator 36 via an inverter 36A. The functions of the inverter 36A and the battery 36B are the same as those of the inverter 24 and the battery 25. A controller 26A is connected to the inverter 36A and the battery 36B. The controller 26A detects or controls a current value supplied to the motor generator 36 from the battery 36B or a current value generated by the motor generator 36.

Figure 4:
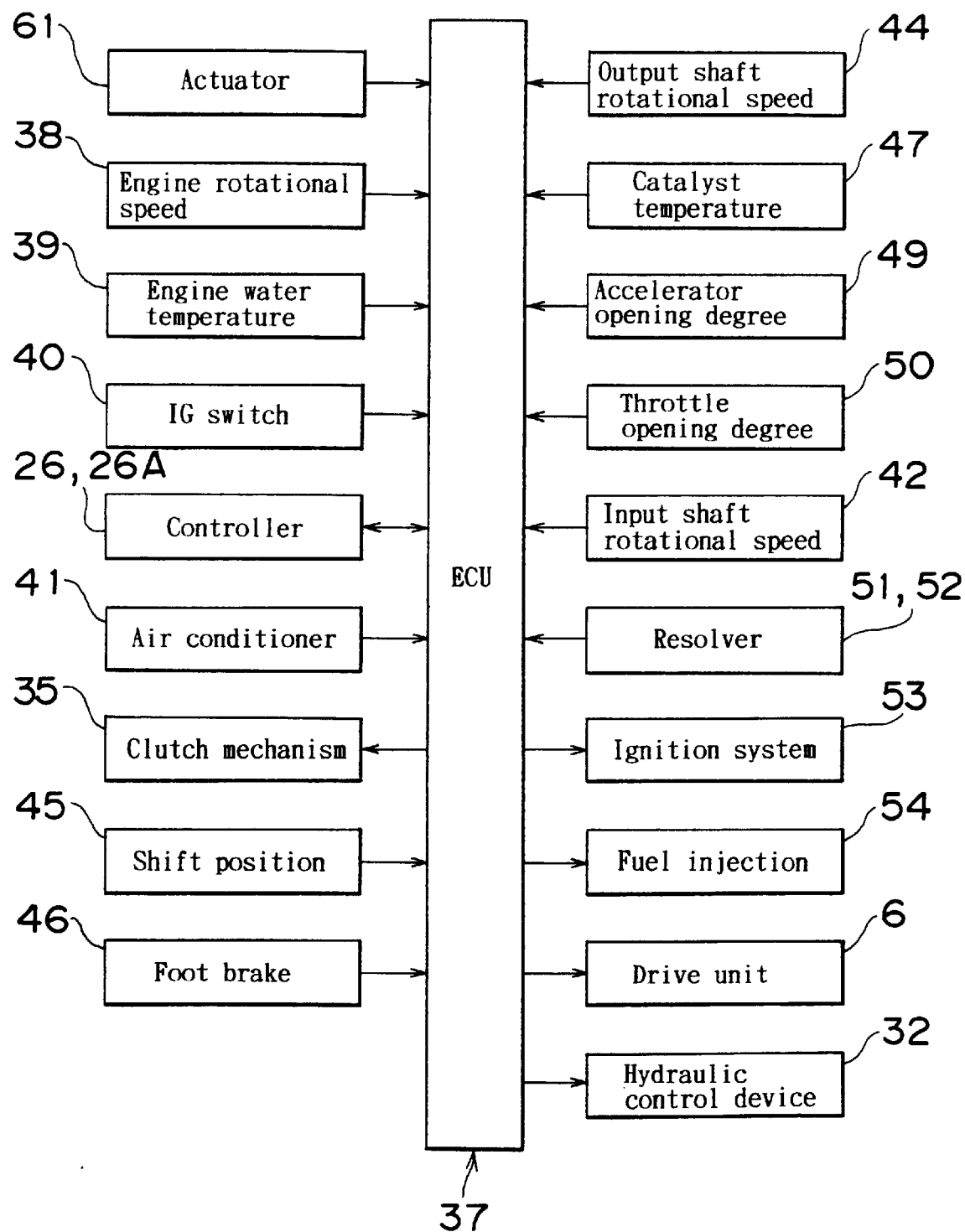
FIG. 4 is a block diagram illustrating the control circuit of the vehicle shown in FIG. 2.

FIG. 4 is a block diagram illustrating a control circuit of the hybrid vehicle. An electronic control unit (ECU) 37 includes a central processing unit (CPU), memories (RAM, ROM), and a microcomputer principally serving as an output and output interface.

Signals inputted to the electronic control unit 37 include signals from an engine rotational speed sensor 38, an engine water temperature sensor 39, an ignition switch 40, controllers 26 and 26A, an air conditioner switch 41, input shaft rotational speed sensor 42 for detecting the rotational speed of input shaft 34, output shaft rotational speed sensor (vehicle speed sensor) 44 for detecting the rotational speed of an output shaft 43 of the speed change gear mechanism 31, a shift position sensor 45 for detecting the operation position of the shift lever 33.

Signals inputted to the electronic control unit 37 further include signals from a foot brake switch 46 for detecting the intention of a driver to decelerate or to brake, a catalyst temperature sensor 47 provided in the course of an exhaust pipe (not shown), an accelerator opening degree sensor 49 for indicating an depression amount of an accelerator pedal 48, throttle opening degree sensor 50 for detecting an opening degree of the electronic throttle valve 2, resolvers 51 and 52 for detecting the rotational speed and the rotation angle of the motor generator 7 and the motor generator 36 separately.

Signals outputted from the electronic control unit 37 include such signals as signals for controlling an ignition system 53 of the engine 1, signals for controlling the controllers 26 and 26A, signals for controlling the clutch mechanism 15 and the brake 22 of the drive unit 6, signals for controlling the hydraulic control device 32, control signals from an actuator 61 for controlling the opening degree of the electronic throttle valve 2, and control signals for engaging and disengaging the clutch mechanism 35.

The controls performed in the hybrid vehicle will be briefly described. When running a vehicle with power from the engine 1 alone, the clutch mechanism 35 is engaged and the torque output from the engine 1 is transmitted to the wheels (not shown) via the output shaft 43 of the speed change gear mechanism 31. The moving parts of the engine 1 are cooled and lubricated by the lubricating system 4 while the engine 1 is driven. While the engine 1 is in operation, a portion of power from the engine 1 is transmitted to the motor generator 7. It is possible to charge the battery 25 with the electrical energy generated by the motor generator 7.

When running the vehicle with power from the engine 1 and the motor generator 7, the clutch mechanism 35 is engaged and the torque output from the engine 1 and the motor generator 7 is transmitted to the input shaft 34 via the crankshaft 3. When running the vehicle with power from the motor generator 36, the clutch mechanism is disengaged and the torque output from the motor generator 36 is transmitted to the input shaft 34.

When the air conditioner switch 41 is turned on while the engine 1 is in a stopped state, the auxiliary 18 is driven by the power from the motor generator 7. The clutch mechanism 35 is disengaged while the vehicle is decelerating, and the torque transmitted to the input shaft 34 from the wheels are input to the motor generator 36. Accordingly, the motor generator 36 functions as a generator, and therefore it is possible to charge the battery 36B with the electrical energy therefrom.

The construction of the hybrid vehicle and its relation to the construction of the invention will now be described. The starter motor 27 and the motor generator 7 correspond to the plurality of starting systems of the invention. Also, the auxiliary 18 corresponds to the functional device, and the batteries 25 and 29 correspond to the plurality of energy sources of the invention, respectively. The motor generator 36 corresponds to the power source, and the input shaft 34 corresponds to the power transmission member of the invention, respectively.

An example of control for selecting a starting mode of the engine 1 according to the state of the vehicle will be described with reference to the flowchart in FIG. 1. First, the input signals are processed in the electronic control unit 37 (step 71) and it is determined whether command for starting the engine 1 has been given (step 72).

For example, if both the engine 1 and the motor generator 7 are stopped and the vehicle is also in a stopped state, it is determined, by the signals from the ignition switch 40, whether the start command for the engine 1 has been given. Also, when the engine 1 is stopped and the motor generator 7 is driven alone, it is determined, from conditions such as an acceleration demand by depression of the accelerator pedal 48, whether start command for the engine 1 has been given. If a negative judgment is made in step 72, the process is returned.

If an affirmative judgment is made in step 72, it is determined whether either the motor generator 7 or the starter motor 27 is failing, in order to determine which starting to system to use to start the engine 1 (step 73). If an affirmative judgment is made in step 73, that is, when either one of the motor generator 7 and the starter motor 27 is failing, a mode (starting mode) for starting the engine 1 independently by a non-failing starting system (that is, a starting system which is functioning normally) is selected (step 74) and the process is returned.

If a negative judgment is made in the step 73, the first associated amount associated with the rotational resistance of the engine 1 is determined, specifically, whether the cooling water temperature TH of the engine 1 is equal to or less than a predetermined value TH1 (step 75). The predetermined value TH1 is stored in the electronic control unit 37. In step 75, the engine oil temperature, and moreover, the viscosity of the engine oil is indirectly estimated based on the engine water temperature. Step 75 is performed for selecting the starting mode of the engine 1 based on the viscosity of the engine oil thus estimated.

Because the cooling water of the water-cooled cooling system 5 flows through the water jacket or the like inside the engine body, it is possible to estimate the temperature of the engine oil supplied to the moving parts of the engine 1 based on the cooling water temperature. The viscosity of the engine oil changes according to the temperature change. Consequently, the rotational resistance of the crankshaft 3 changes due to the changes in engine oil viscosity, and the torque required for starting the engine 1 changes.

If a negative judgment is made in step 75, a torque greater than the predetermined value is required for starting the engine 1, because the viscosity of the engine oil is greater than the predetermined value. Therefore, a starting mode A for employing both the starter motor 27 and the motor generator 7 is selected (step 76) and the process is returned. That is, the engine 1 is started by the torque outputted from both the starter motor 27 and the motor generator 7. Accordingly, the startability of the engine is improved even when the rotational resistance of the crankshaft 3 is high.

Figure 5:
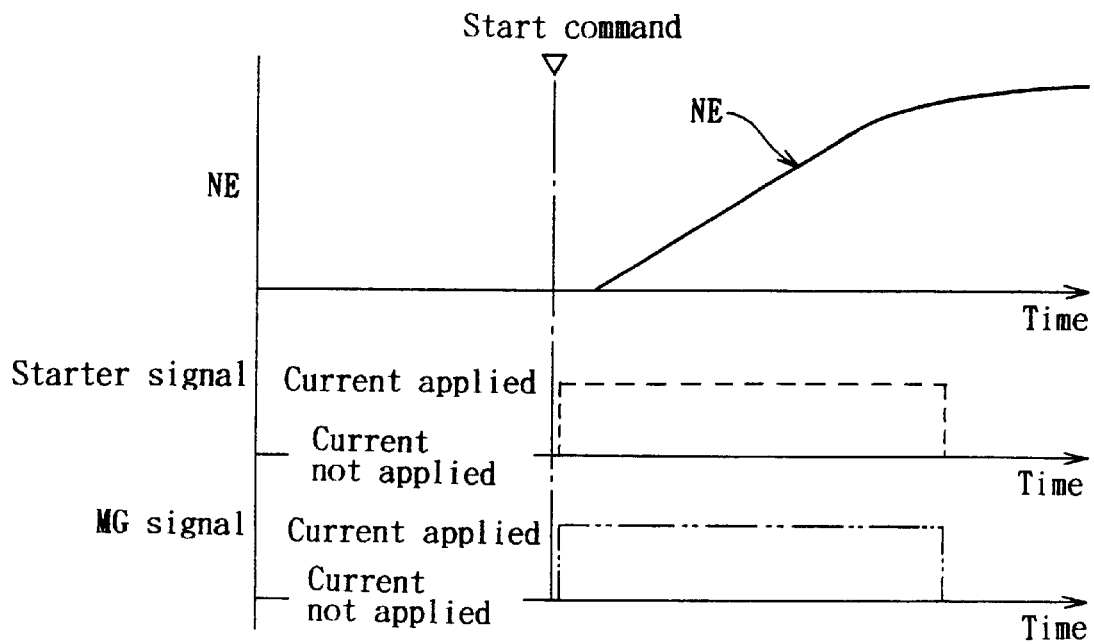
FIG. 5 is a time chart showing an example of the engine starting mode implemented in a control example shown in FIG. 12.

FIG. 5 is a time chart illustrating a state of a system corresponding to step 76. When the start command for the engine 1 is output at a predetermined time, the starter motor 27 and the motor generator 7 are switched from current non-applied state to current applied state substantially at a same time. Accordingly, the engine rotational speed NE increases by the power from the starter motor 27 and the motor generator 7.

Because the cooling water temperature TH of the engine 1 is equal to or lower than the predetermined value TH1, the engine rotational speed NE tends to increase slowly. Consequently, a comparatively long period is required for the rise in the engine rotational speed. Then, the fuel is injected by a fuel injection system 54 and ignited by the ignition system 53, whereby the engine 1 rotates without the aid of the starter motor 27 and the motor generator 7 and the starter motor 27 and the motor generator 7 are switched from the current applied state to the current non-applied state.

If a negative judgment is made in the step 75, the torque required for starting the engine 1 is equal to or less than the predetermined value, because the rotational resistance of the crankshaft 3 is equal to or less than the predetermined value. That is, the process proceeds to step 77, because there is little possibility of the starting mode being restricted by the viscosity of the engine oil. Step 77 corresponds to a case where the engine 1 is started in a state where the vehicle is running by the power from the motor generator 36 alone. Accordingly, when the vehicle is running by the power from the motor generator 36 alone, the clutch mechanism 35 is disengaged to suppress the power loss of the motor generator 36.

In this state, when it is determined to start the engine 1 in accordance with the acceleration demand of the vehicle, the engine 1 is started and control is performed to engage the clutch mechanism 35 so as to transmit the power of the engine to the input shaft 34. Therefore, it is determined in step 77, whether a vehicle speed V is exceeding a predetermined value V1, as another condition for selecting the starting mode of the engine 1. The vehicle speed V is determined in accordance with the signals from the output shaft rotational speed sensor 44. The predetermined value V1 is stored in the electronic control unit 37 in advance.

Figure 6:
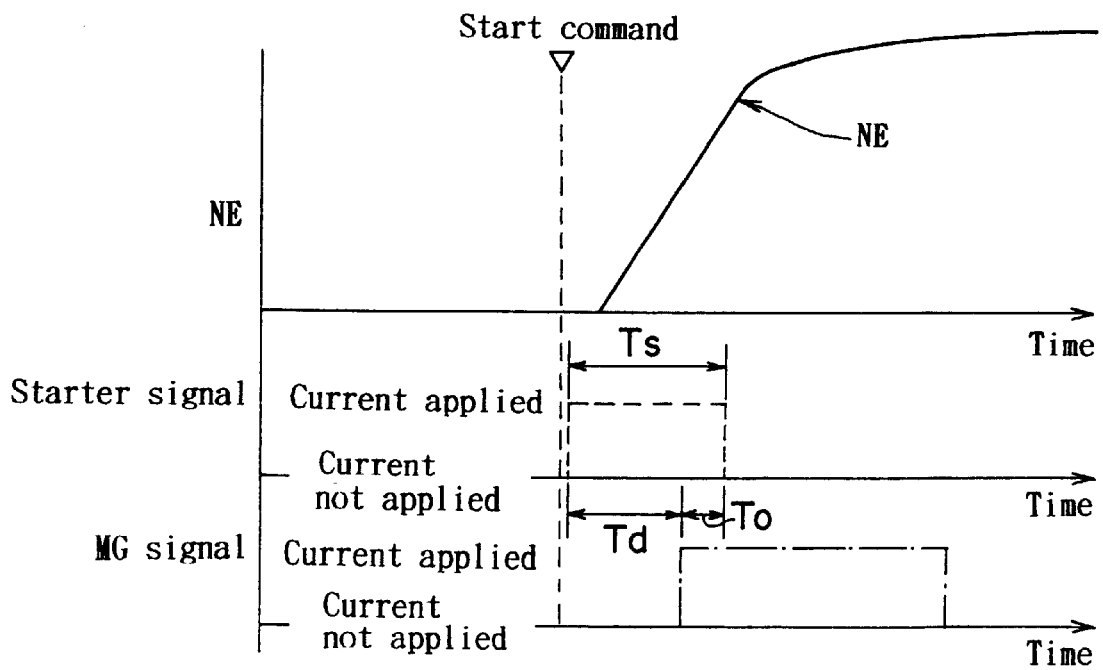
FIG. 6 is a time chart showing another example of the engine starting mode implemented in a control example shown in FIG. 12.

If an affirmative judgment is made in step 77, engaging the clutch mechanism 35 in that state may cause a shock due to a rapid change in the torque from the output shaft 43. Therefore, when employing both the starter motor 27 and the motor generator 7, a starting mode B is selected (step 78) and the process is returned. FIG. 6 is a time chart illustrating a state of a system corresponding to step 78. When the command for starting the engine 1 is output, only the starter motor 27 is switched from the current non-applied state to the current applied state. Consequently, the engine rotational speed NE increases.

Here, the output rotational speed of the starter motor 27 is limited because of its characteristics. Therefore, the motor generator 7 is switched from the current non-applied state to the current applied state before the engine rotational speed NE reaches the predetermined value. Next, the starter motor 27 is switched from the current applied state to the current non-applied state, and the power from the motor generator 7 is used to increase the engine rotational speed NE to a predetermined high speed rotational range. Then, the fuel is injected from the fuel injection system 54 and ignited by the ignition system 53, and the motor generator 7 is switched from the current applied state to the current non-applied state. Thus, the timings for driving and stopping differ between the starter motor 27 and the motor generator 7 in the starting mode B.

As described above, the clutch mechanism 35 is engaged after the engine rotational speed NE is increased until the engine rotational speed NE is synchronized with the rotational speed of the input shaft 34. Therefore, the rapid change in the torque from the output shaft 43 upon engagement of the clutch mechanism 35 is suppressed, preventing a shock thereby.

If a negative judgment is made in the step 77, there is little possibility of the starting mode of the engine 1 being restricted, because a difference between the engine rotational speed NE and the rotational speed of the input shaft 34 is equal to or less than a predetermined value. Accordingly, it is determined whether the auxiliary 18 is being driven (step 79) as another condition for selecting the starting mode of the engine 1. The criteria for step 79 may include signals from the air conditioner switch 41, current value of the motor generator 7, and engagement state of the brake 22, for example.

If an affirmative judgment is made in step 79, the clutch mechanism 15 cannot be engaged immediately to start the engine 1, because the rotational speed of the motor generator 7 is equal to or greater than the predetermined value. It is also difficult to reduce the rotational speed of the motor generator 7 because the auxiliary 18 is in operation. Therefore, the process proceeds to step 78 to start the engine 1 with the starting mode B. That is, the engine 1 is started by the power from the starter motor 27 and the engine rotational speed NE is increased to a predetermined value. Then, the clutch mechanism 15 is engaged so as to switch to a state for starting the engine by the power from the motor generator 7.

If a negative judgment is made in steps 75, 77, and 79, as far as the condition corresponding to each step goes, the starting mode of the engine 1 is not particularly a concern. Therefore, the starting mode of the engine 1 is selected (step 80) based on the conditions other than those already mentioned and the process is returned. In step 80, for example, it is possible to select the starting mode for the motor generator 7 alone in order to improve the response of the engine 1 to starting.

Also in step 80, it is possible to monitor the state of charge of the batteries 25 and 29 and to select a starting mode for starting the engine 1 by a starting system connected to a battery with higher state of charge than the other. By selecting a starting mode for starting the engine 1 by a starting system connected to the battery with higher state of charge, deterioration of startability of the engine 1 due to decrease in battery state of charge or further decrease of the battery state of charge can be suppressed.

Figure 1:
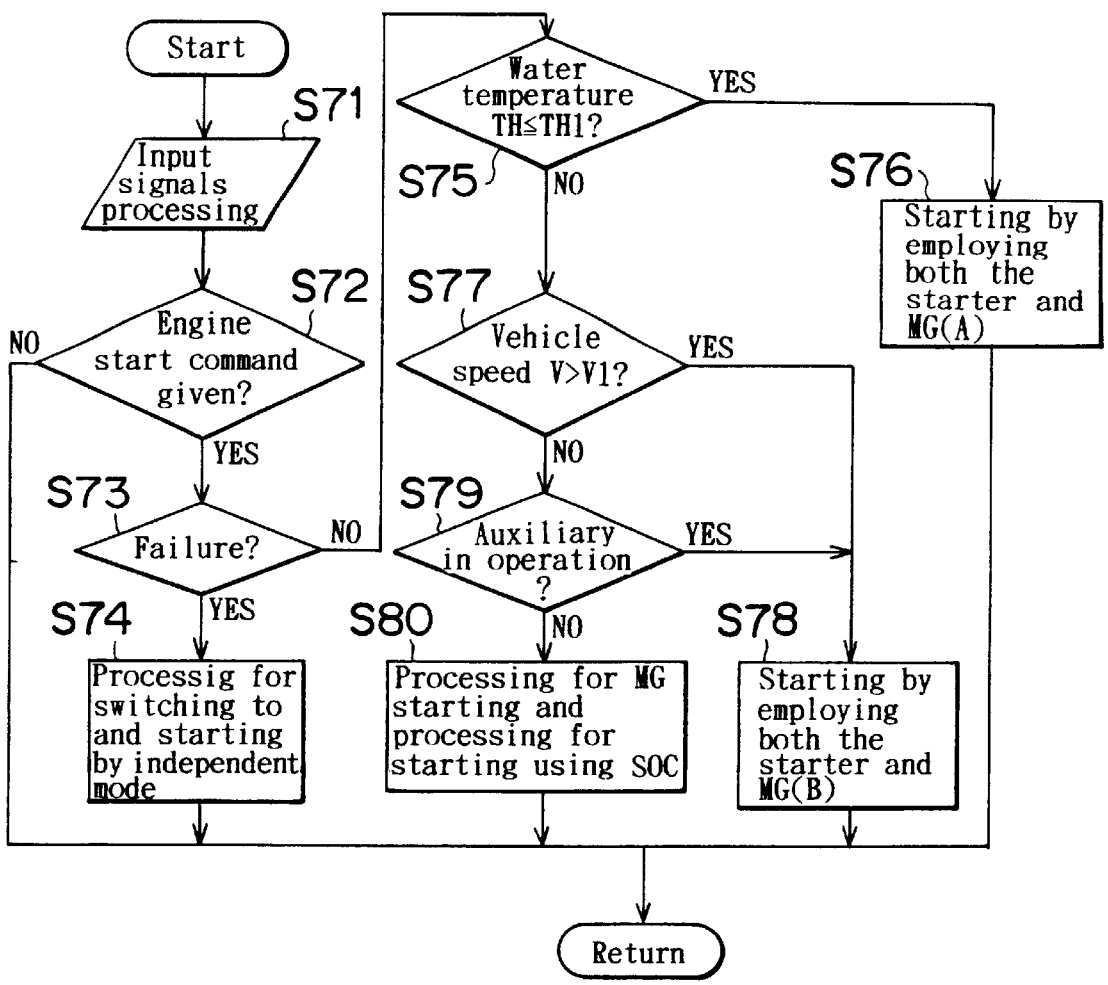
FIG. 1 is a flowchart showing an example of control in the invention.

In the example of control shown in FIG. 1, selecting the starting mode of the engine 1 based on conditions other than the condition in step 78, upon selection of the starting mode of the engine 1, is applicable to a vehicle not provided with the motor generator 36. Also, the example of control in FIG. 1 is applicable to a manual transmission capable of changing the gear ratio by manual operation of the shift lever.

The example of control shown in FIG. 1 is applicable to a vehicle capable of controlling the driving and stopping of the engine based on the conditions other than signals from the ignition switch. That is, the engine is automatically stopped when predetermined stop conditions are met, and the engine is restored to a drive state when a predetermined restoration conditions are met. Consequently, the commands for starting the engine in step 72 include commands to start the engine by predetermined restoration conditions.

A second embodiment of the invention will be explained in detail with reference to the drawings.

Figure 7:
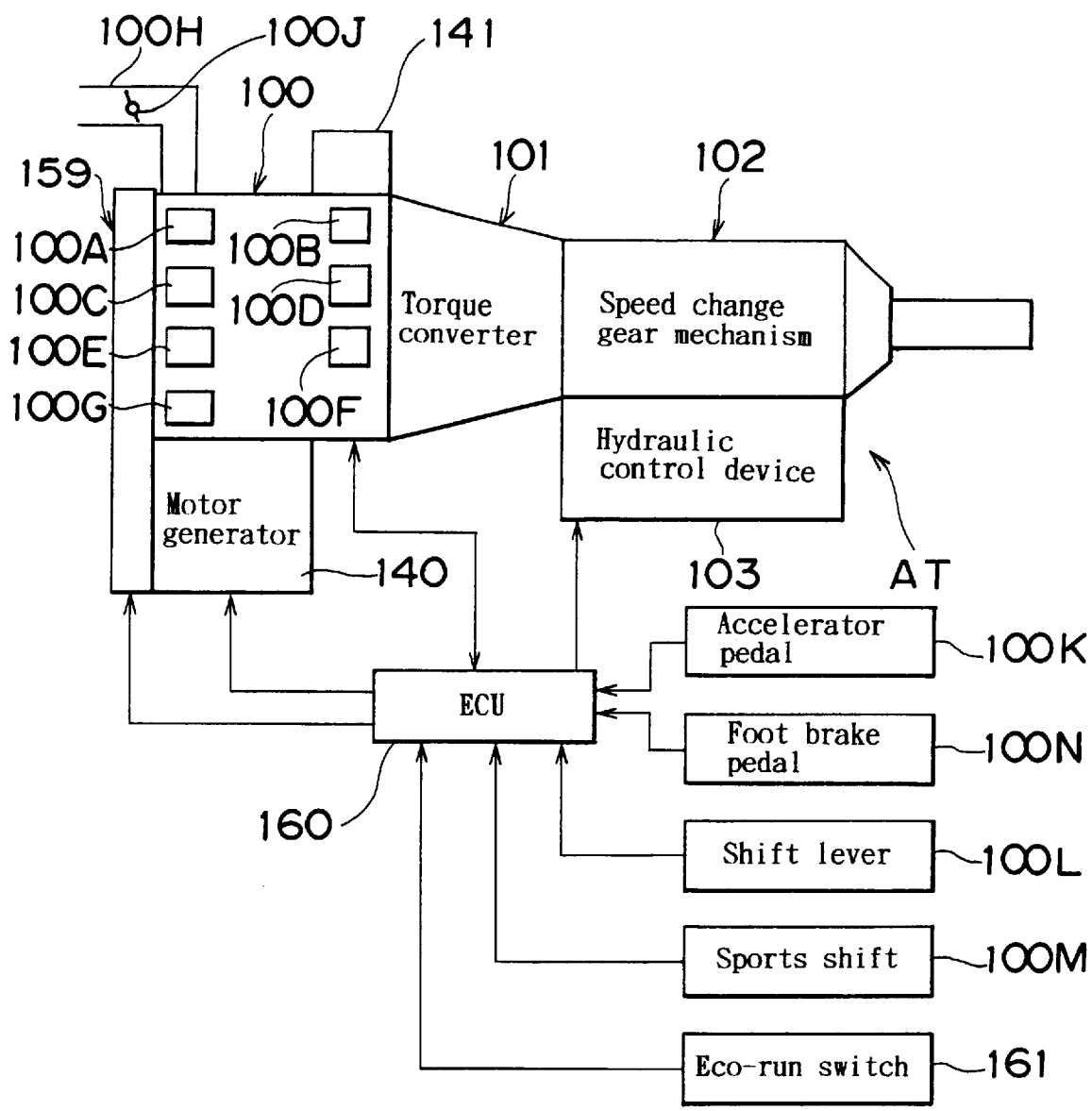
FIG. 7 is a block diagram illustrating the construction of other components of the vehicle to which the invention is applied.

FIG. 7 is a block diagram illustrating the constructions of other systems of a vehicle to which the invention is applied. Such internal combustion engines as a gasoline engine, a diesel engine, and an LPG engine are used as an engine 100 which serves as a power source for the vehicle. The gasoline engine (hereinafter referred to as the engine) 100 includes a fuel injection system 100A, an intake system 100B, an exhaust system 100C, an ignition system 100D, a water-cooled cooling system 100E having the same construction and function as the water-cooled cooling system 5 described in the first embodiment, a valve mechanism 100F for opening and closing valves of the intake system 100B and the exhaust system 100C, a lubricating system 100G having same construction and function as the lubricating system 4 described in the first embodiment.

An electronic throttle valve 100J is provided in an intake pipe 100H of the engine 100. The electronic throttle valve 100J is constructed such that the opening degree is electrically controlled based on a depression amount of an accelerator pedal 100K and other conditions. The power output from the engine 100 is transmitted to a torque converter 101 and an automatic transmission AT. The automatic transmission AT includes a speed change gear mechanism 102 and a hydraulic control device 103.

Figure 8:
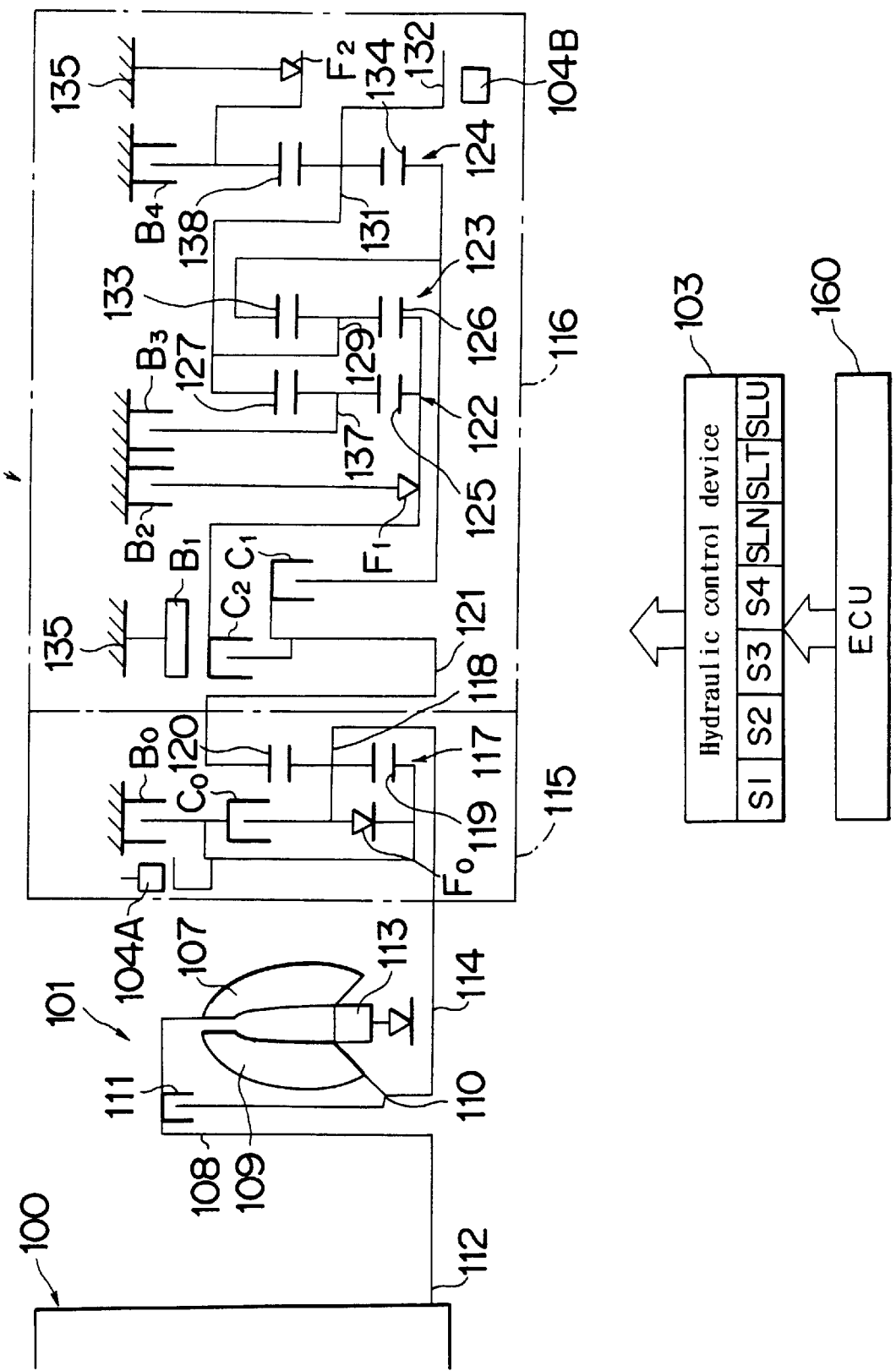
FIG. 8 is a skeleton diagram illustrating the construction of a drive train of the vehicle shown in FIG. 7.

FIG. 8 is a skeleton diagram illustrating a construction of the torque converter 101 and the speed change gear mechanism 102. The torque converter 101 and the speed change gear mechanism 102 are built into a casing 135. Automatic transmission fluid is filled inside the casing 135 as hydraulic fluid. The torque converter 101 transmits torque from members on a driving side to members on a driven side by means of the transmission fluid. The torque converter 101 includes a front cover 108 integrally formed with a pump impeller 107, a hub 110 integrally attached with a turbine runner 109, and a lock-up clutch 111. The torque from the pump impeller 107 is transmitted to the turbine runner 109 by means of fluid. The lock-up clutch 111 is for selectively engaging and disengaging the front cover 108 and the hub 110. The lock-up clutch 111 may be slip-controlled so as to slide the lock-up clutch at a predetermined engagement pressure.

The front cover 108 is connected to a crankshaft 112 of the engine 100. A stator 113 is disposed on the inner periphery side of the pump impeller 107 and the turbine runner 109. The stator 113 is for increasing the torque which is transmitted to the turbine runner 109 from the pump impeller 107. An input shaft 114 is connected to the hub 110. Therefore, when torque is output from the crankshaft 112 of the engine 100, the torque is transmitted to the input shaft 114 via the torque converter 101 or the lock-up clutch 111.

The speed change gear mechanism 102 includes a secondary transmission 115 and a primary transmission 116. The secondary transmission 115 includes a planetary gear mechanism 117 for overdrive. The input shaft 114 is connected to a carrier 118 of the planetary gear mechanism 117. A multi-plate disk clutch C0 and a one-way clutch F0 are provided between the carrier 118 and a sun gear 119 constituting the planetary gear mechanism 117. The one-way clutch F0 is engaged when the sun gear 119 rotates in the positive direction with respect to the carrier 118, that is, when the sun gear 119 rotates in the rotation direction of the input shaft 114. A ring gear 120, which is an output element of the secondary transmission 115, is connected to an intermediate shaft 121, which is an input element of the primary transmission 116. A multi-plate disk brake B0 for selectively stopping the rotation of the sun gear 119 is also provided.

Therefore, in the secondary transmission 115, the planetary gear mechanism 117 rotates integrally in a state with either the multi-plate disk clutch C0 or the one-way clutch F0 engaged. Consequently, the intermediate shaft 121 rotates at a same speed as the input shaft 114 resulting in a low-speed shift. Also, in a state where the rotation of the sun gear 119 is stopped by engaging the brake B0, the ring gear 120 is accelerated with respect to the input shaft 114, resulting in a high-speed shift.

The primary transmission 116 is provided with three pairs of planetary gear mechanisms 122, 123, and 124. The rotating element included in the three pairs of planetary gear mechanisms 122, 123, and 124 are connected as described hereunder. A sun gear 125 of a first planetary gear mechanism 122 and a sun gear 126 of a second planetary gear mechanism 123 are integrally connected to each other. A ring gear 127 of the first planetary gear mechanism 122, a carrier 129 of the second planetary gear mechanism 123, and a carrier 131 of a third planetary gear mechanism 124 are connected. An output shaft 132 is connected to the carrier 131. The output shaft 132 is connected to a wheel (not shown) via a torque transmission device (not shown). A ring gear 133 of the second planetary gear mechanism 123 is connected to a sun gear 134 of the third planetary gear mechanism 124.

In a gear train of the primary transmission 116, one reverse shift and four forward shifts can be set. Frictional engagement devices, or a clutch and a brake, for setting such transmission shifts are provided as described hereunder. A first clutch C1 is provided between an intermediate shaft 121 on one side and the ring gear 133 and the sun gear 134 on the other side. A second clutch C2 is provided between the intermediate shaft 121 on one side and the sun gear 125 and the sun gear 126 connected to each other on the other side.

A first brake B1 is a hand brake, and is disposed so as to stop the rotation of the sun gear 125 of the first planetary gear mechanism 122 and the sun gear 126 of the second planetary gear mechanism 123. A first one-way clutch F1 and a second brake B2, which is a multi-plate disk brake, are disposed in series between the sun gears 125, 126 and the casing 135. The first one-way clutch F1 is engaged when the sun gears 125 and 126 rotate in reverse, that is, when the sun gears 125 and 126 rotate in a direction opposite to the rotational direction of the input shaft 114.

A third brake B3, which is a multi-plate disk brake, is disposed between a carrier 137 of the first planetary gear mechanism 122 and the casing 135. The third planetary gear mechanism 124 is provided with a ring gear 138. A fourth brake B4, which is a multi-plate disk brake, and a second one-way clutch F2 are provided to stop the rotation of the ring gear 138. The fourth brake B3 and the second one-way clutch F2 are disposed in parallel between the casing 135 and the ring gear 138. The second one-way clutch F2 is engaged when the ring gear 138 rotates in reverse. An input rotational speed sensor (turbine rotational speed sensor) 104A for detecting the input rotational speed of the speed change gear mechanism 102 and an output rotational speed sensor (vehicle speed sensor) 104B for detecting the rotational speed of the output shaft 132 of the speed change gear mechanism 102 are provided.

In the speed change gear mechanism 102 constructed as described above, five forward shifts and one reverse shift can be set by engaging and disengaging the frictional engagement devices such as the clutches and the brakes, as shown in the operation chart in FIG. 9. In FIG. 9, O indicates that the frictional engagement devices are engaged, Δ indicates that the frictional engagement devices are engaged upon engine braking, ⊕ indicates that the frictional engagement devices are either engaged or disengaged, in other words, the engagement of the frictional devices is irrelevant to the transmission of torque, and a blank indicates that the frictional engagement devices are disengaged.

In the embodiment described above, a P (parking) position, an R (reverse) position, an N (neutral) position, a D (drive) position, a 4 position, a 3 position, a 2 position, and L (low) position, for example, can be set by manual operation of a shift lever 100L. The D position, the 4 position, the 3 position, the 2 position, and the L position are forward positions. In a state where the D position, the 4 position, the 3 position, and the 2 position are set, the shift positions can be shifted between a plurality of shift positions. On the other hand, in the case where the L position or the reverse position R is set, a single shift position is maintained. In a state where either the D position, the 4 position, the 3 position, or the 2 position is selected, the shift position of the automatic transmission AT can be changed manually (up-shift or down-shift) by operation of a sports shift switch 100M.

The hydraulic control device 103 shown in FIG. 7 and FIG. 8 performs setting or switching control of the shift positions in the speed change gear mechanism 102, engagement, disengagement, and slip-control of the lock-up clutch 111, control of the line pressure of the hydraulic circuit, control of the engagement pressure of the frictional engagement device. The hydraulic control device 103 is electrically controlled, and is provided with first through third solenoid valves S1 through S3 for implementing the shifting of the speed change gear mechanism 102, and a fourth solenoid valve S4 for controlling the state of engine brake.

The hydraulic control device 103 is further provided with a linear solenoid valve SLT for controlling the line pressure of the hydraulic circuit, a linear solenoid valve SLN for controlling the accumulator back pressure during transition of shifting of the speed change gear mechanism 102, and a linear solenoid valve SLU for controlling the engagement pressure of the lock-up clutch and predetermined frictional engagement devices. The ECU 160 controls the solenoid valve or the like by the signals input from the various sensors, and engages or disengages respective clutches and brakes (frictional engagement devices).

Figure 10:
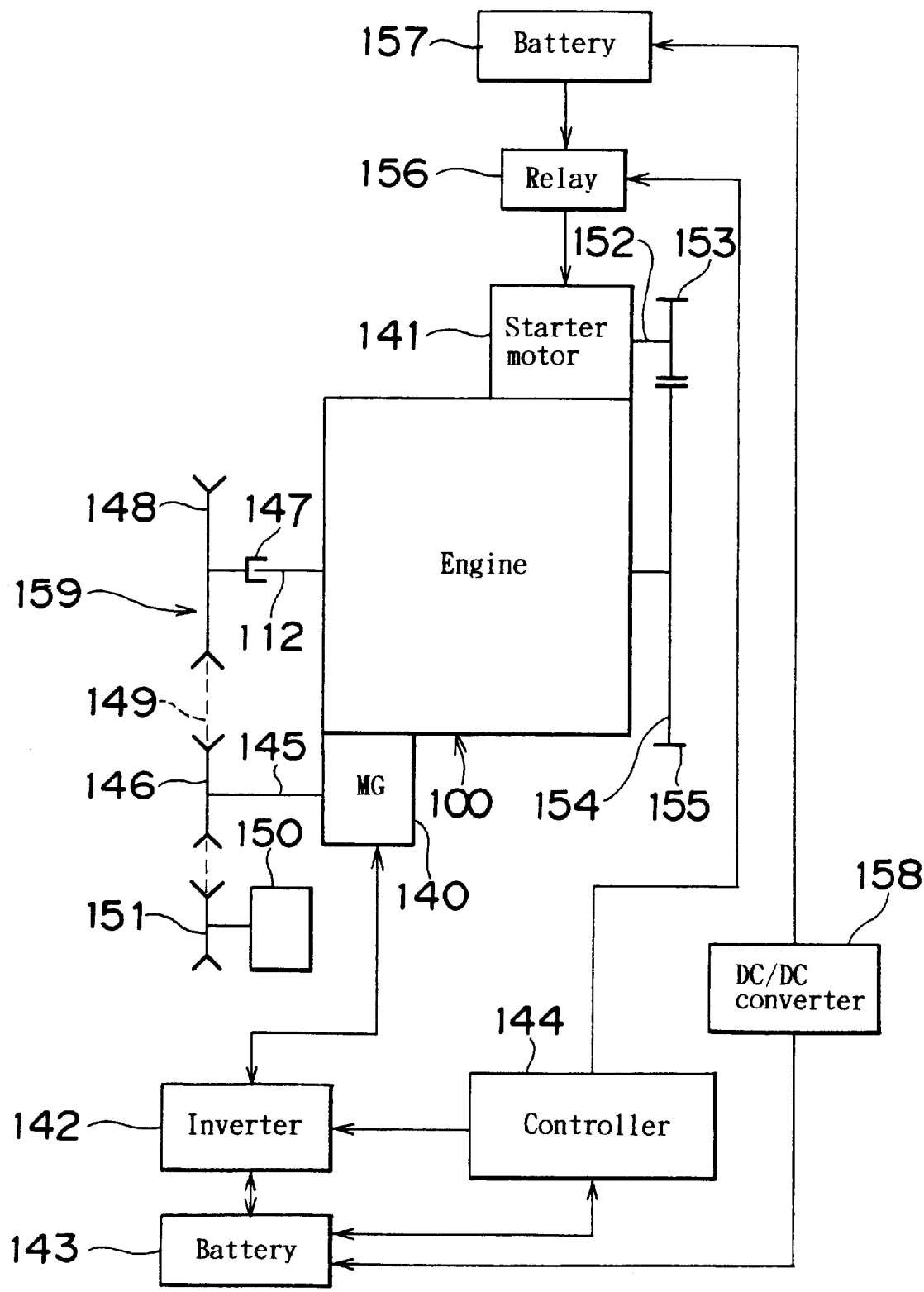
FIG. 10 is a block diagram illustrating the starting system of the engine of the vehicle shown in FIG. 7.

FIG. 10 is a diagram illustrating the starting system of the engine 100. A motor generator (MG) 140 and a starter motor 141 for starting the engine 100 are provided. For example, an electric motor of three-phase alternating current synchronous type is employed as the motor generator 140. The motor generator 140 is provided with a rotor (not shown) having a permanent magnet (not shown) and a stator (not shown) wound with a coil (not shown). A rotating magnetic field is generated when a three-phase alternating current is applied to a three-phase coil. Torque is then generated by controlling the rotating magnetic field according to the rotational position and rotational speed of the rotor. The torque generated by the motor generator 140 is substantially proportional to the size of current. The rotational speed of the motor generator 140 is controlled by the frequency of the alternating current.

A battery 143 is connected to the motor generator 140 via an inverter 142. A controller 144 is connected to the motor generator 140, the inverter 142, and the battery 143. Rated voltage of the battery 143 is set at a high voltage of approximately 288V. The inverter 142 switches the direct current to alternating current. The inverter 142 also changes the frequency and current value. To achieve these functions, the inverter is provided with a switching relay excitation control circuit. The inverter 142 also switches the alternating current to the direct current. This is done by a built-in commutator. The controller 144 is an electronic control unit for controlling the motor generator 140, and is provided with a high speed processor function.

A pulley 146 is attached to the main shaft 145 of the motor generator 140. A pulley 148 is connected to the crankshaft 112 via a clutch 147. A belt 149 is wound around a pulley 148 and the pulley 146. The belt 149 is also wound around a pulley 151 of an auxiliary 150 such a compressor (not shown) for air conditioner, a water pump (not shown) constructing a portion of the water-cooled cooling system 100E of the engine 100, or a pump (not shown) for a power steering unit.

A control mode of the motor generator 140 may be selected from among a starting mode for starting the engine 100 by the power of the motor generator 140, a generating mode for employing the motor generator 140 as a generator (alternator) by the power of the engine 100, and an auxiliary drive mode for driving the auxiliary 150 by the power of the motor generator.

When employing the motor generator 140 as a starting system, the clutch 147 is engaged, and the power from the motor generator 140 is transmitted to the engine 100 via the belt 149 to start the engine 100. The radius of the pulley 146 is smaller than the radius of the pulley 148, and the pulleys 146 and 148 function as deceleration devices. That is, the rotational speed of the motor generator 140 is decelerated before being transmitted to the engine 100. The motor generator 140 controls the rotational speed in the range of 0 to 5000 rpm and the torque in the range of 0 to 20 N m, for example.

When the generating mode is selected, the clutch 147 is engaged, and the power from the engine 100 is transmitted to the motor generator 140 to make the motor generator 140 function as a generator. Induced voltage generated by the rotation of the motor generator 140 can be converted to direct current voltage by the inverter 142 for charging the battery 143. When the auxiliary drive mode is selected according to such conditions as stopping of the engine 100, the clutch 147 is disengaged, and the power output from the motor generator 140 is transmitted to the auxiliary 150 via the belt 149 and the pulley 151 to drive the auxiliary 150. A belt drive device 159 includes the aforementioned pulleys 146 and 148, the belt 149, and the clutch 147.

The controller 144 detects or controls a current value supplied to the motor generator 140 from the battery 143 or a current value generated by the motor generator 140. Also, the controller 144 controls the rotational speed of the motor generator 140 and detects and controls a state of charge (SOC) of the battery 143.

The starter motor 141 is an electric motor of a direct current (series) type, such as a magnetic shift type or a reduction gear type, having a known construction. A pinion gear 153 (spur gear) is provided on the output shaft 152 of the starter motor 141. The output shaft 152 has an retractable mechanism, not shown, so that it is reciprocatable in axial direction. A ring gear (spur gear) 155 is formed on the fly wheel 154 of the crankshaft 112. The pinion gear 153 and the ring gear 155 may also be referred to as a small gear and a large gear, respectively.

A battery 157 is connected to the starter motor 141 via a relay 156. Rated voltage of the battery 157 is set at a low voltage of approximately 12 V, for example. The relay 156 is controlled by the controller 144. A DC/DC converter 158 is provided on a circuit between the battery 143 and the battery 157. The DC/DC converter 158 reduces the direct current of the battery 143 to a predetermined voltage and charges the battery 157.

The relay 156 is turned on according to a start demand of the engine 100, and power is supplied to the starter motor 141 from the battery 157. Thus, the starter motor 141 is driven and the engine 100 is started thereby. Accordingly, the starter motor 141 is driven at a rotational speed corresponding to a load torque at starting of the engine 100 and a battery current or a voltage at starting of the engine 100. A large starting torque is generated on activation of the starter motor 141 due to a heavy-current.

The output of the motor generator 140 is generally set to 1.5 to 3 times of the output of the starter motor 141. Thus, the output characteristics differ between the motor generator 140 and the starter motor 141. However, the starting torque of the motor generator 140 upon starting the engine 100 is low. Therefore, when starting the engine 100 by the motor generator 140, it is difficult to start the engine 100 in a state where a deceleration device (including a pulley) having a large reduction gear ratio is not connected between the motor generator 140 and the engine 100. It is especially difficult to start the engine 100 smoothly with a motor generator 140 in a cold state.

When the engine 100 is not started by the starter motor 141, the pinion gear 153 and the ring gear 155 are disengaged. When the engine 100 is started by the starter motor 141, the pinion gear 153 moves in the axial direction to be engaged with the ring gear 155.

Figure 11:
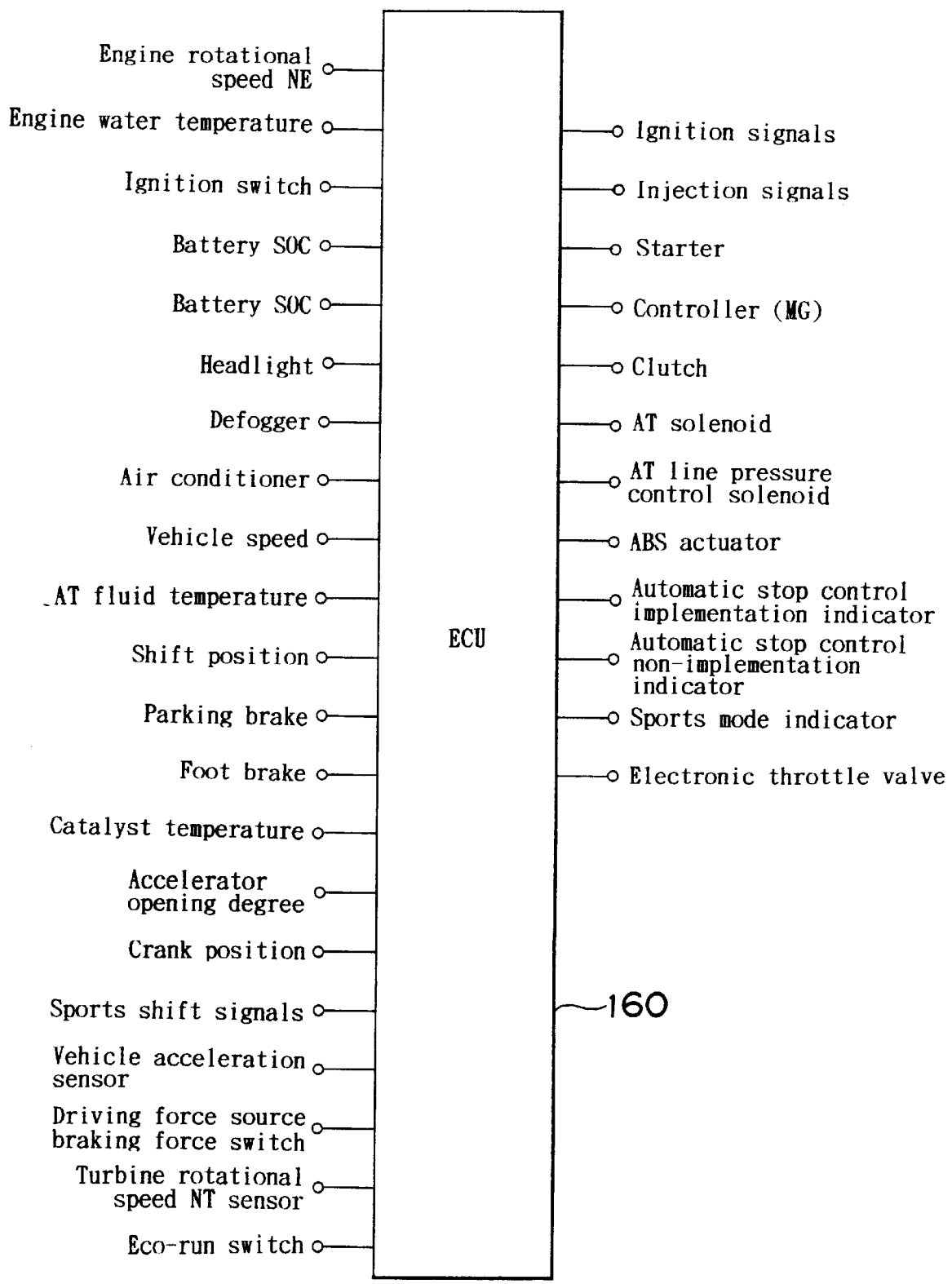
FIG. 11 is an explanatory diagram showing the input and output signals of an electronic control unit controlling the vehicle shown in FIG. 7.

FIG. 11 is an explanatory diagram showing the input and output signals of an electronic control unit (ECU) 160 controlling the systems installed on a vehicle. The electronic control unit 160 includes a central processing unit (CPU), memories (RAM, ROM), and a microcomputer principally serving as an input and output interface. Signals input to the electronic control unit 160 include signals from an engine rotational speed sensor, engine water temperature, an ignition switch, eco-run switch 161 for starting (setting) and canceling the eco-run system which automatically stops and restores the engine 100 based on conditions other than the ignition switch, state of charge of the batteries 143 and 157 detected by the controller 144, a head light switch, a defogger switch, an air conditioner switch, an output shaft rotational speed sensor (vehicle speed sensor) 104B, a fluid temperature sensor for detecting the temperature of the automatic transmission fluid (ATF) which is the hydraulic fluid of an automatic transmission AT, and a shift position sensor for detecting the operation position of the shift lever 100L.

Signals input to the electronic control unit 160 also include signals from a foot brake switch for detecting the depression state of a foot brake 100N shown in FIG. 7, a sensor for indicating the operation state of a parking brake, a catalyst temperature sensor provided in the course of an exhaust pipe (not shown), an accelerator opening degree sensor for indicating an depression amount of an accelerator pedal 100K a crank position sensor, operation signals of a sports shift switch 100M, signals from a vehicle acceleration sensor, a driving force source brake switch, and a turbine rotational speed sensor 104A.

Signals output from the electronic control unit 160 include signals for controlling the ignition timing of the engine 100, signals for controlling the fuel injection of the engine 100, signals for controlling the driving and stopping of the starter motor 141, signals for controlling the motor generator 140 via the controller 144, signals for engaging and disengaging the clutch 147, signals for controlling the AT solenoid (shift solenoid valve S1, S3, and S4) of the hydraulic control device 103, and signals for controlling the AT line pressure control solenoid (linear solenoid valve SLT). A shift diagram (shift map) having the accelerator opening degree as parameter and a lock-up clutch control map are stored in the electronic control unit 160, so that the control signals for the hydraulic control device 103 are output according to the signals input to the electronic control unit 160 and the data. Thus, the change gear ratio of the automatic transmission AT or the lock-up clutch 111 are automatically controlled.

Signals output from the electronic control unit 160 also include signals for an actuator of an anti-lock brake system (ABS), signals for automatic stop control implementation indicator of the engine 100, signals for the automatic stop control implementation indicator, signals for a sports mode indicator, and control signals for the electronic throttle valve 100J are output from the electronic control device 160.

The automatic stop control refers to automatically stopping the engine in a drive state according to the conditions other than the signals from the ignition switch, and automatically restoring the engine 100 from a stopped state to a drive state. Stop conditions for automatically stopping the engine 100 in a drive state are met, for example, when the accelerator pedal 100K is off, the foot brake pedal 100N is on, the vehicle speed is 0 (the vehicle is stopped), and the state of charge SOC of the battery 143 is equal to or greater than a predetermined value, while the eco-run system is being activated (set) with the eco-run switch 161 turned on.

On the other hand, in the case where at least one item of the stopping conditions is missing, the automatic restoration conditions are met, resulting in a restoration of the drive state of the engine 100 from the automatically stopped state. Accordingly, when restoring the drive state of the engine 100 from the automatically stopped state, at least one of the motor generator 140 and the starter motor 141 is driven, and the power therefrom is transmitted to the engine 100 to start the engine 100. When the eco-run switch 161 is turned off, the eco-run system is canceled and the vehicle returns to an ordinary state, that is, a state where the engine 100 is started and stopped by the operation of the ignition key. Thus, the eco-run system is controlled by the electronic control unit 160.

Also, the engine 100 is capable of performing VVT (variable valve timing) control which continuously varies the opening and closing timings of an intake valve of the intake system 100B according to the change in vehicle speed. The VVT control will be briefly explained. The hydraulic pressure supplied to the controller attached to a timing belt pulley of the camshaft on intake side of the intake system 100B is controlled according to the running state (vehicle speed, opening degree of the electronic throttle valve 100J, etc.) of the vehicle detected by the electronic control unit 160. The controller changes a rotational phase of the intake-side camshaft and the timing belt pulley based on the supplied hydraulic pressure, and continuously varies the intake valve timing. As a result, high-efficiency and high-torque can be achieved in each rotational speed segment of the entire rotational speed range of the engine 100.

Now, the second embodiment will be described. The pinion gear 153 and the ring gear 155 correspond to the gear transmission of the invention, the starter motor 141 corresponds to the first starting system of the invention, and the motor generator 140 corresponds to the second starting system of the invention.

Figure 12:
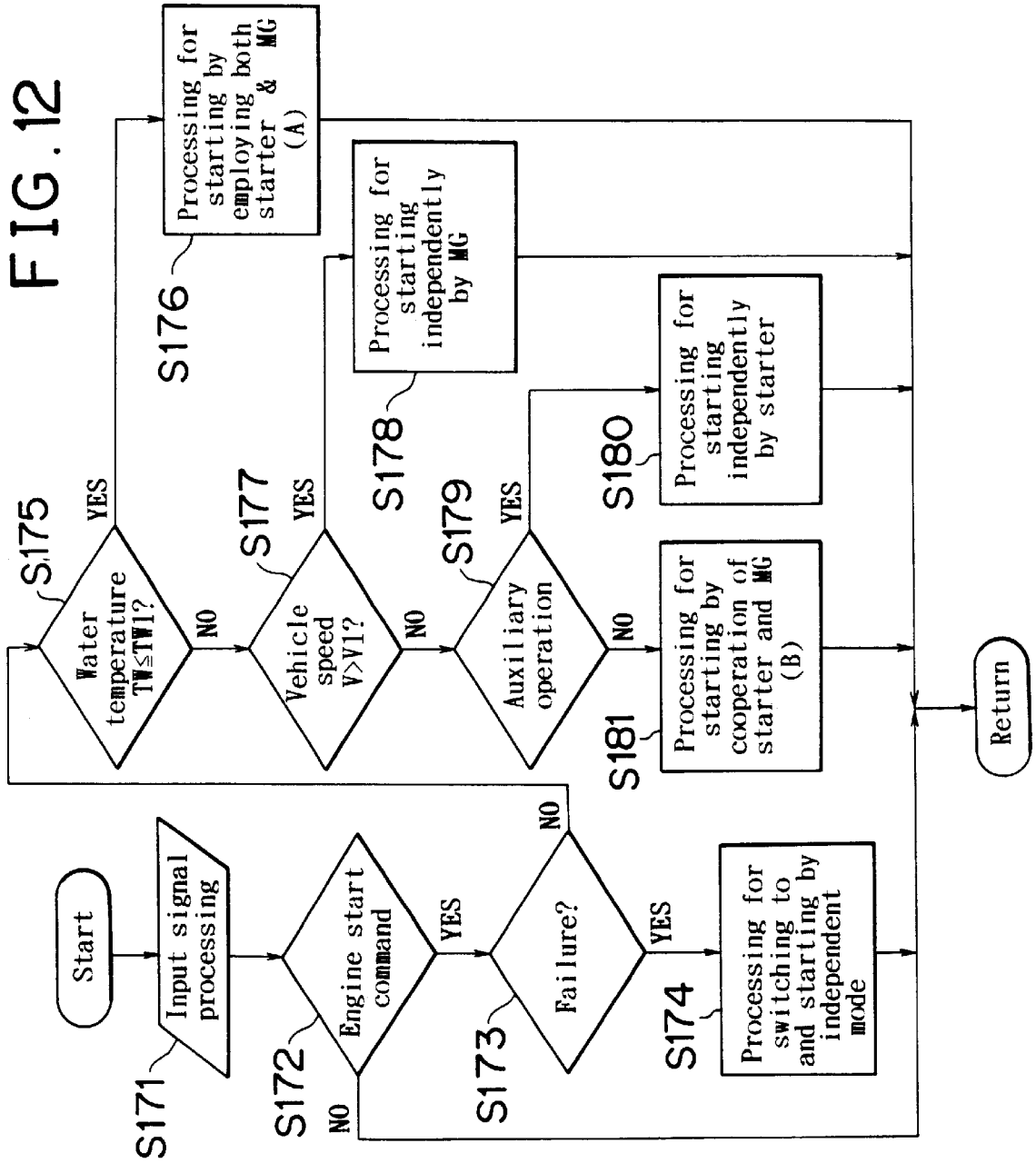
FIG. 12 is a flowchart illustrating the content of control performed in the vehicle shown in FIG. 7.

The start control for starting the engine 100 in a stopped state while the eco-run system is operated will be described with reference to the flowchart in FIG. 12. First, the input signals are processed in the electronic control unit 160 (step 171) and it is determined whether a starting command for automatically starting the engine 100 in an automatically stopped state has been given (step 172). Specifically, the starting command is output when at least one of the automatic stop conditions is missing. If a negative judgment is made in step 172, the process is returned.

If an affirmative judgment is made in step 172, it is determined whether the engine start functions of the motor generator 140 and the starter motor 141 are failing in order to select the starting mode of the engine 100 (step 173). If either one of the motor generator 140 and the starter motor 141 is failing, the starting mode is selected such that the starting system which is not failing (that is, the starting system that is functioning normally) starts the engine 100 independently (step 174), and the process is returned.

If a negative judgment is made in step 173, the rotational resistance of the engine 100 is determined, to be specific, it is determined whether the cooling water temperature TW is equal to or less than a predetermined value TW1 (step 175). Further, the predetermined value TW1 is stored in the electronic control unit 160. In step 175, the engine oil temperature, and further, the viscosity of the engine oil are indirectly estimated to select the starting mode of the engine 100 according to the engine oil viscosity. As the viscosity of the engine oil increases, the rotational resistance of the crankshaft 112 increases, and the torque required for starting the engine 100 changes. Therefore, step 175 is conducted for selecting a starting mode at which the torque conforming to the rotational resistance is obtained.

If an affirmative judgment is made in step 175, the viscosity of the engine oil is equal to or greater than the predetermined value such that a torque equal to or greater than the predetermined value is required when starting the engine 100. This occurs when the outside temperature GTH is lower than a predetermined value GTH1. A drag resistance of the crankshaft 112 becomes equal to or greater than a predetermined value when starting the engine 100. Therefore, the starting mode A (according to the timing chart in FIG. 5) is selected (step 176). Also, fuel is injected by the fuel injection system 100A at a point where the engine rotational speed reaches a predetermined value. Then, the fuel is ignited by the ignition system 100D, and the engine 100 rotates autonomously. Then, the process is returned.

The engine 100 is started by the torque output from both the starter motor 141 and the motor generator 140. Therefore, even in the case where the rotational resistance of the crankshaft 112 is high as described above, the startability of the engine 100 can be improved. The starting mode A is applicable when starting the engine 100 at an extremely low temperature (early morning in winter, for example) by operation of the ignition key (not shown).

If a negative judgment is made in step 175, the rotational resistance of the crankshaft 112 at starting of the engine 100 is equal to or less than the predetermined value, and a torque required for starting the engine 100 is equal to or less than the predetermined value. That is, the process proceeds to step 177, because there is little possibility of the starting mode being restricted by the viscosity of the engine oil. Therefore, it is determined in step 177, whether the vehicle speed V is exceeding the predetermined value V1, as another condition for selecting the starting mode of the engine 1. The vehicle speed V is determined in accordance with the signals from the output shaft rotational speed sensor 104B. The predetermined value V1 is stored in the electronic control unit 106 in advance.

If an affirmative judgment is made in step 177, the engine rotational speed is controlled at a value equal to or greater than the predetermined value in order to drive the compressor which performs hydraulic control in the VVT control. Because the ring gear 155 and the pinion gear 153 rotate relative to each other, it is difficult to engage the ring gear 155 and the pinion gear 153. Therefore, it is not preferable to start the engine 100 by the power from the starter motor 141. Accordingly, processing is performed to start the engine 100 by the power from the motor generator 140 alone (step 178), and the process is returned.

If a negative judgment is made in step 177, it is determined whether the auxiliary 150 is being driven by the power from the motor generator 140, as another condition for selecting the starting mode of the engine 100 (step 179). If an affirmative judgment is made in step 179, it is difficult to start the engine 100 smoothly while engaging the clutch 147, because the crankshaft 112 and the pulley 148 rotate relative to each other. Therefore, a mode for starting the engine 100 by the starter motor 141 alone is selected (step 180) and the process is returned.

If a negative judgment is made in step 179, the engine 100 is started by the starting mode B (cooperation of motor generator 140 and the starter motor 141) explained in the first embodiment (step 181) and the process is returned. The process proceeds to step 181 via steps 175, 177, and 179 when the engine 100 is automatically stopped after the engine 1 has been started and warmed up by the operation of the ignition key. In such case, the viscosity of the engine oil is low. Therefore, the rotational resistance of the crankshaft 112 at starting of the engine 100 is comparatively small, resulting in a small torque required for starting the engine 100. This corresponds to a case where the cooling water temperature TW of the engine 100 is greater than the predetermined value TW1, and the drag resistance of the crankshaft 112 by the engine oil is small. Consequently, even if the engine 100 is started by the starting mode B, good startability of the engine 100 is maintained.

Control performed in step 181 will be described in detail. As shown in FIG. 6, first, electricity is supplied to the starter motor 141 to start its operation, and driving of the motor generator 140 starts when Td seconds have lapsed after beginning driving of the starter motor 141. That is, both the starter motor 141 and the motor generator 140 are driven after the lapse of Td seconds. After Ts seconds have lapsed from the start of current supply to the starter motor 141 (that is, after Td seconds+To seconds have lapsed), the supply of electricity to the starter motor 141 is stopped. After that point, driving of the motor generator 140 alone is continued, and the supply of electricity to the motor generator 140 is stopped when the engine rotational speed reaches the predetermined value after ignition is performed by the ignition system 100D. The Ts seconds is set at 0.05 to 0.25 seconds, for example.

Using the characteristics of the starter motor 141, which is a direct current motor, a heavy current is supplied to the starter motor 141 for an extremely short time in order to obtain a large torque, and the torque thus output from the starter motor 141 is used to start the crankshaft 112. The rotational speed of the crankshaft 112 is further increased by driving the motor generator 140 before supply of electricity to the starter motor 141 is stopped, so as to start the engine 100. That is, both the starter motor 141 and the motor generator 140 are driven simultaneously for an extremely short time.

In step 181, it is possible to monitor the state of charge of the batteries 143 and 157, and select a starting mode which starts the engine 100 by a starting system connected to the battery with higher state of charge than the other. In step 172 in FIG. 12, it is possible to determine whether a command for starting the engine 100 has been given based on the signals from the ignition switch.

Figure 13:
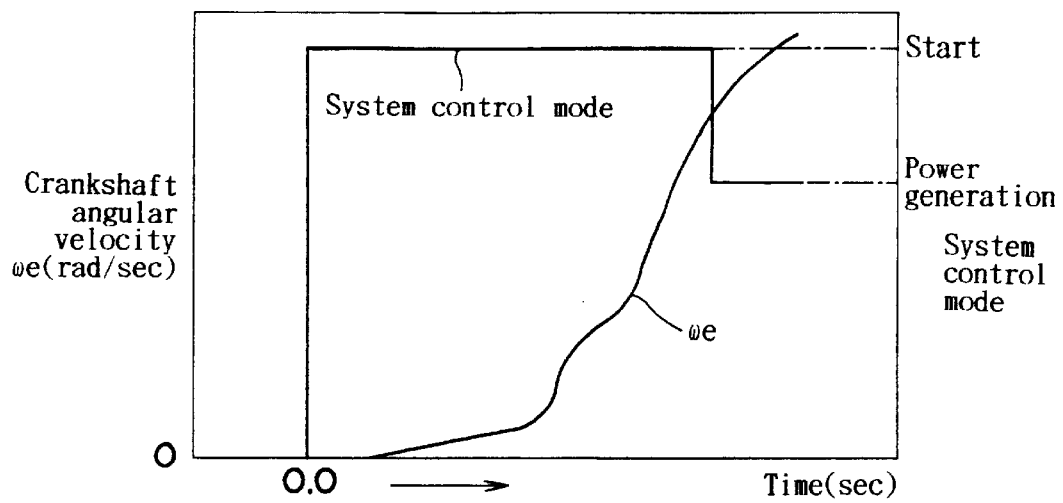
FIG. 13 is a chart illustrating the change of the angular velocity of the crankshaft and change of the control mode of the eco-run system against time, and the chart corresponds to the control example shown in FIG. 12.
Figure 14:
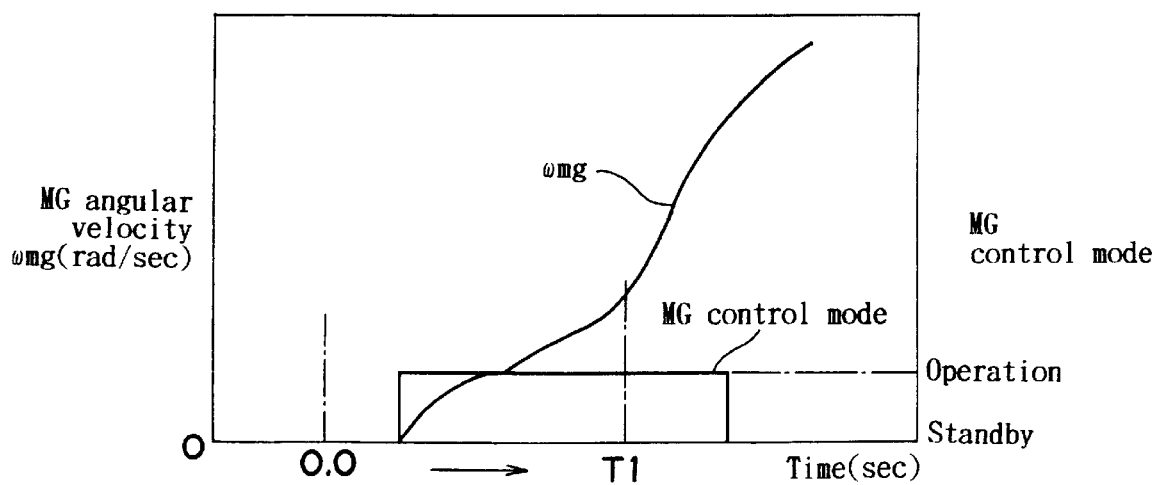
FIG. 14 is a chart illustrating the change of the control mode of a motor generator and the change of the angular velocity of the motor generator against time, and the chart corresponds to the control example shown in FIG. 12.
Figure 15:
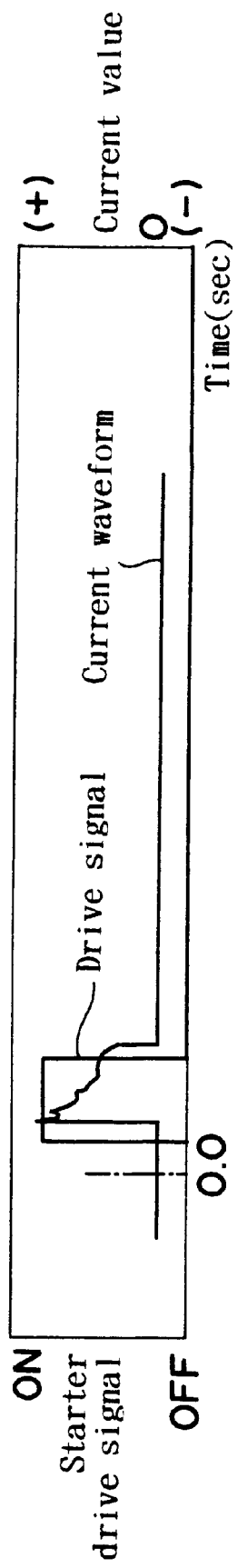
FIG. 15 is a chart illustrating the changes of the drive signals of a starter motor and current supplied thereto against time, and the chart corresponds to the control example shown in FIG. 12.

The state of each system corresponding to the starting mode B of step 181 in FIG. 12 will be described in accordance with FIGS. 13 through 15. FIG. 13 is a chart illustrating the change of the angular velocity ωe of the crankshaft 112 and change of the control mode of the eco-run system against time while the eco-run system is being set. FIG. 14 is a chart illustrating change of the control mode of a motor generator 140 and change of the angular velocity ωmg of the main shaft 145 of the motor generator 140 against time. FIG. 15 is a chart illustrating the changes of the drive signal of a starter motor 141 and current supplied thereto against time.

First, when the command to start the engine 100 is output at 0.0 second, as shown in FIG. 13, the control mode of the eco-run system is switched to the starting mode. Then, as shown in FIG. 15, after a predetermined time has lapsed from the output of the start command (0.05 seconds, for example), the drive signal of the starter motor 141 is switched from off to on. Accordingly, a predetermined current is supplied to the starter motor 141 and the starter motor 141 is driven. Also, as shown in FIG. 13, the angular velocity ωe of the crankshaft 112 increases gradually from zero. Then, as shown in FIG. 14, the control mode of the motor generator 140 is switched from a standby (non-drive) mode to a drive mode, and the angular velocity ωmg of the motor generator 140 gradually increases from zero. The motor generator 140 is switched to the drive mode 0.126 seconds, for example, after the output of start command.

As shown in FIG. 15, the current which has been supplied to the starter motor 141 gradually decreases, and the drive signals of the starter motor 141 are switched from on to off. The drive signals of the starter motor 141 are on for 0.105 seconds, for example. Driving of the motor generator 140 is continued even after the signals for the starter motor 141 are off, and the fuel is injected and ignited at point T1 when the crankshaft 112 has been rotated a predetermined number of times. Thus, the control mode of the motor generator 140 is switched to the standby mode after the engine 100 is started. Then, the motor generator 140 is switched to the generating mode. Because the power of the engine 100 is transmitted to the motor generator 140 after the engine 100 is started, the rotational speed of the motor generator continues to increase.

As described above, the engine 100 is started by the starter motor 141 and the motor generator 140 in the control performed in step 181 when automatically restoring the engine 100, which has been automatically stopped, to a running state. Because the drive time of the starter motor 141 is set extremely short, the engagement time of the pinion gear 153 and the ring gear 155 disposed in the power transmission pathway from the starter motor 141 to the engine 100 becomes as short as possible. Therefore, the engine starting mode employing both the starter motor 141 and the motor generator 140 is better in suppressing the generation of noise at starting of the engine 100 as compared to the starting mode employing only the starter motor 141. Also, in the starting mode employing both the starter motor 141 and the motor generator 140, the engine 100 can be started smoothly and quickly due to cooperation of the starter motor 141 and the motor generator 140.

Also, a deceleration device including a gear transmission is not provided in the power transmission pathway including the belt transmission between the motor generator 140 and the engine 100. Therefore, when starting the engine 100 by driving the motor generator 140, gear noise and other abnormal sounds originating in the gear backlash is prevented. Because a transmission device, such as a speed change gear mechanism is not required, lubricating oil for engaging portions are not required as well. Accordingly, temperature increase and power loss caused by agitation of the lubricating oil are eliminated, resulting in a simple construction. Therefore, a compact and inexpensive engine starting system can be provided. The construction of the speed change gear mechanism 102 is applicable to the speed change gear mechanism 31 shown in FIG. 2.

Characteristic construction of the invention based on the embodiments will be explained. A first construction relates to an engine start control system having a first starting device and a second starting device capable of starting an engine, wherein a starting mode selector is provided for continuously driving the first starting device and the second starting device and, simultaneously driving the first starting device and the second starting device momentarily, when starting the engine. The first construction is characterized by driving the first starting device for a short time, then driving the second starting device before stopping electricity supply to the first starting device, supplying fuel to the engine, and starting the engine by igniting the fuel with ignition system.

Also, it is possible to set the drive time of the first starting device shorter than the drive time of the second starting device. Specifically, the drive time of the first starting device can be set at 0.08 seconds to 0.20 seconds. It is possible to set the output from the first starting device smaller than the output from the second starting device. Specifically, the output from the second starting device can be set to 0.4 to 0.7 times the output from the first starting device. The setting of drive times or outputs is provided as an example only, and the values are subject to change depending on the tuning.

The form of the power transmission mechanism provided between the engine and the first starting device and the form of the power transmission mechanism provided between the engine and the second starting device may be different. Specifically, a power transmission mechanism having a gear transmission is provided between the engine and the first starting device whereas a power transmission mechanism having a belt transmission is provided between the engine and the second starting device.

The engagement or the disengagement of the gears of the gear transmission can be selectively controlled. Also, the belt transmission includes a first pulley connected to a crankshaft side and a second pulley connected to the second starting device side. The reduction gear ratio is set by making the radii of the first pulley and the second pulley different. The working principle of the first starting device and the second starting device may be different. Specifically, the first starting device is composed of a direct current type motor and the second starting device is composed of a three-phase alternating current type motor.

A second construction relates to an engine start control system having a first and a second starting devices connected to a crankshaft of an engine, wherein a sixth starting mode selector is provided for first driving the first starting device, then driving the second starting device before the first starting device stops operating, when starting the engine. The engine start control system is characterized by having a first starting device connected to the crankshaft via a first transmission, and having the second starting device connected to the crankshaft via a second transmission.

In the second construction, the engine start control system is provided with the first starting device and the second device including different elements in respective transmission mechanisms. In the second construction, the engine start control device is provided with the first transmission being provided with the gear transmission and the second transmission being provided with the belt transmission. The first transmission of the engine start control system is provided with a pair of large and small gear transmission devices, such that the small gear and the large gear are selectively engaged and disengaged.

In the second construction, the first and the second starting devices are provided with electric motors based on different types of working principles. The first starting device is provided with a direct current type motor and the second starting device is provided with a three-phase alternating current type motor. In the second construction, the second transmission has a belt transmission, and no other deceleration means than a plurality of pulleys for setting the reduction gear ratio by the difference between the radii are provided in the power transmission pathway of the belt transmission. Here, the ratio of the pulley radius can be set to 2:4.

The second construction of the engine start control system is such that the drive time of the first starting device is set shorter than the drive time of the second starting device. It is possible to set the drive time of the first starting device at 0.1 seconds and the drive time of the second starting device at 0.6 seconds. In the second construction, the output of electric motor of the first starting device is set smaller than the output of the electric motor of the second starting device. It is possible to set the output of the electric motor of the first starting device at 1.0 kw and the output of the electric motor of the second starting device at 2.5 kw.

In the illustrated embodiment, the controller (electronic control unit 37 or 160) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 1 and/or 12 and described herein can be used as the controller. A distributed processing architecture can be used for maximum data/signal processing capability and speed.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An engine start control system, comprising a plurality of starting devices capable of starting the engine and a controller that:

determines a viscosity of engine oil of the engine;

selects a starting mode of the engine by the plurality of starting devices based on the determined engine oil viscosity, and wherein at least two of the plurality of starting devices are selected by the controller when it is estimated that the viscosity of the engine oil is equal to or greater than a predetermined value.

2. An engine start control system, comprising a plurality of starting devices capable of starting an engine, wherein any one of the plurality of starting devices is capable of driving functional devices other than the engine, and a controller that:

determines drive states of the functional devices; and selects the starting mode of the engine by the plurality of starting devices based on the determined drive states.

3. The engine start control system according to claim 2, wherein the drive states of the functional devices are rotational speeds of the functional devices.

4. An engine start control system, comprising a plurality of starting devices capable of starting an engine, a plurality of energy sources supplying energy to the respective plurality of starting devices, and a controller that:

determines states of the plurality of energy sources; and selects a starting mode of the engine by the plurality of starting devices based on the determined states of the plurality of energy sources.

5. The engine start control system according to claim 4, wherein the controller detects states of charge of the plurality of energy sources, and the controller selects the starting device to which energy is supplied from the energy source having a comparatively high state of charge, as at least a part of the engine starting mode.

6. An engine start control system, comprising a power transmission member to which power from at least one of an engine and power sources other than the engine are provided, a plurality of starting systems capable of starting the engine, and a controller that:

determines a difference between engine rotational speed and rotational speed of the power transmission member; and selects the starting mode of the engine by the plurality of starting systems based on the determined difference.

7. An engine start control system, comprising a first starting device linked to an engine by a gear transmission and capable of starting the engine by transmitting power to the engine via the gear transmission, a second starting device linked to the engine by a belt transmission and capable of starting the engine by transmitting power to the engine via the belt transmission and a controller that:

upon starting the engine, first drives the first starting device, then drives the second starting device, and continues driving of the second starting device after driving of the first starting device is terminated.

8. The engine start control system according to claimed 7, wherein the first starting device is a starter motor which is a transmission motor of a direct current type, the second starting device is a motor generator.

9. The engine start control system according to claim 7, wherein a drive time of the first starting device is shorter than a drive time of the second starting device.

10. The engine start control system according to claim 7, wherein an output value of the first starting device is smaller than an output value of the second starting device.

11. An engine start control system, comprising a first starting device connected to a crankshaft of an engine, a second starting device connected to the crankshaft of the engine; and a controller that:

upon starting the engine, drives the first starting device, then subsequent to initiating the driving of the first starting device, initiates driving of the second starting device before driving of the first starting device is terminated.

12. The engine start control system according to claim 11, wherein the first starting device is a starter, and the second starting device is a motor generator.

* * * * *